United States Patent [19]

Gittinger

[11] Patent Number: 4,521,803
[45] Date of Patent: Jun. 4, 1985

[54] SYSTEM FOR COMPATIBLE TRANSMISSION OF HIGH-RESOLUTION TV

[75] Inventor: Norman C. Gittinger, Schenectady, N.Y.

[73] Assignee: General Electric Company, Schenectady, N.Y.

[21] Appl. No.: 433,562

[22] Filed: Oct. 7, 1982

[51] Int. Cl.³ .............................................. H04N 9/32
[52] U.S. Cl. ...................................... 358/12; 358/141
[58] Field of Search ................................ 358/12, 141

[56] References Cited

U.S. PATENT DOCUMENTS 3,542,951 11/1970 Wolff ................................. 358/141

FOREIGN PATENT DOCUMENTS 850024 9/1960 United Kingdom .................. 358/12

Primary Examiner—Richard Murray
Attorney, Agent, or Firm—Geoffrey H. Krauss; James C. Davis, Jr.; Marvin Snyder

[57] ABSTRACT

A high-resolution television system is described which provides twice the vertical resolution of present television standards and is compatible therewith. A high-resolution television camera substantially simultaneously provides information from each of a pair of adjacent scan lines; the luminance information of both lines is added to provide information for amplitude modulation onto a luminance carrier, while the difference in luminance of the two adjacent scan lines is utilized to modulate a carrier phased in quadrature with the luminance carrier. The chrominance values of both lines are added to modulate a chrominance carrier. The bandwidth of the resulting luminance and chrominance signals are compatible with that of a carrier modulated by a single raster line. At a television receiver, a synchronous quadrature detector provides the sum and difference luminance signals, which are then respectively added to and subtracted from one another to obtain the adjacent line luminance signals for display upon a picture tube in a high-definition television set. A standard television set utilizes only the additive luminance signal to display a compatible picture. Increased horizontal definition, by increasing transmitted signal bandwidth or by utilization of horizontal interlace, and/or increased chroma definition, may be utilized alone or in conjunction with increased vertical resolution to provide a total high-resolution television picture.

98 Claims, 45 Drawing Figures

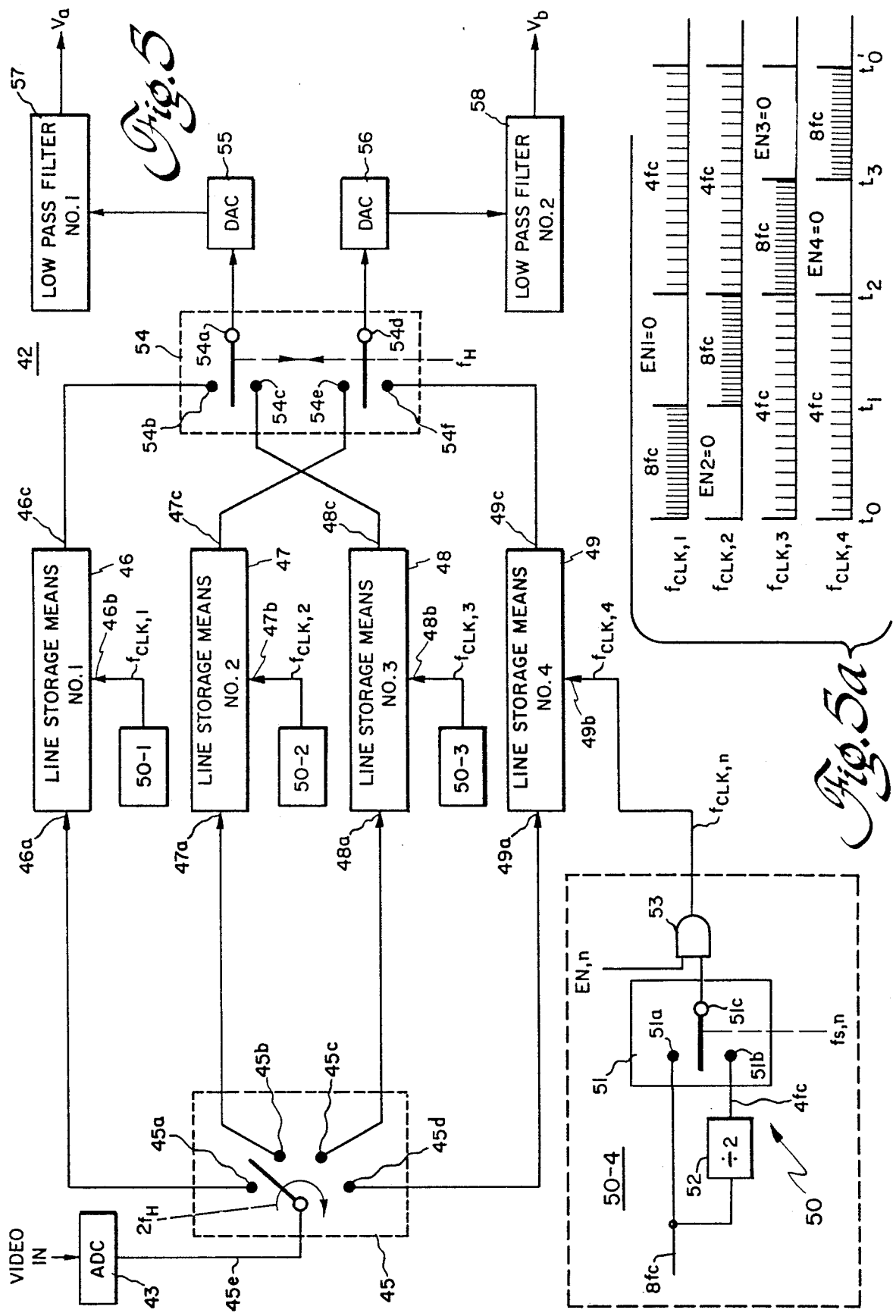

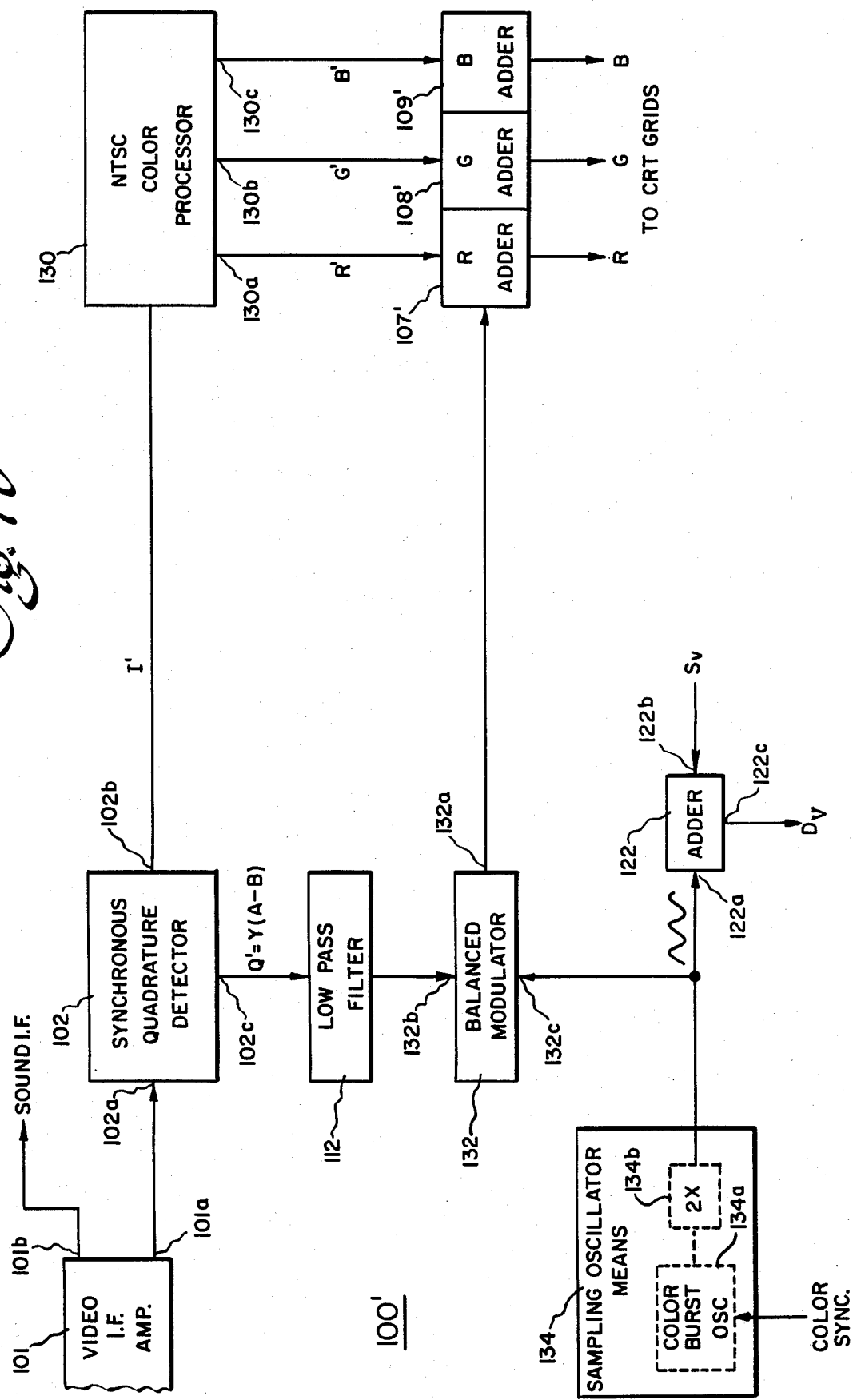

SYSTEM FOR COMPATIBLE TRANSMISSION OF HIGH-RESOLUTION TV

BACKGROUND OF THE INVENTION

The present invention relates to television transmission and, more particularly, to a novel system for increasing the vertical and/or horizontal resolution of television images, while remaining compatible with receivers utilizing present television standards.

It is highly desirable to increase the resolution of the pictures provided by present day television systems. Present standards, e.g. the NTSC standard utilized in the United States and several other countries, utilize a vertical resolution of about 525 lines for a TV signal transmitted with a maximum 6 MHz. bandwidth. While other transmission standards exist, such as the PAL, SECAM and the like standards, all present standards utilize approximately the same vertical resolution and channel bandwidth. It is known that improving vertical and/or horizontal resolution by approximately a factor of 2 will dramatically increase the perceived quality of television pictures. Hitherto, such high-resolution TV systems have required an extremely large transmitted bandwidth, typically from about 20 MHz. to about 40 MHz., which large bandwidth is too great to be used with the extensive VHF TV and CATV networks presently in operation. A second major problem is that the transmission standards utilized for previously suggested high-resolution TV systems are essentially incompatible with present-day transmission standards; the millions of TV receivers presently in existence could not provide any picture, of any quality whatsoever, if tuned to these proposed high-resolution television system signals. Furthermore, the signals from hitherto proposed high-resolution television systems cannot be easily converted to present-day standards, whereby a television station or CATV system would require a dual plant, with all of the many economic disadvantages entailed therein. It is therefore highly desirable to provide a system for transmitting high-resolution television in a manner which is also compatible with the present transmission standards, whereby present receivers can provide a picture of presently-acceptable quality, and high-resolution television (HRTV) receivers can provide higher quality pictures with increased vertical and/or horizontal resolution.

BRIEF SUMMARY OF THE INVENTION

In accordance with the invention, a system for transmission of compatible high-resolution television signals utilizes a high-resolution camera, at a transmitting end, for raster scanning a pair of adjacent horizontal scan lines substantially in a simultaneous manner. The luminance information from each of the pair of scan lines is added to provide a first luminance signal utilized to amplitude modulate a luminance carrier, while the difference in luminance information from the two scan lines is utilized to amplitude modulate a carrier in phase-quadrature with the luminance carrier. If a color TV signal is to be transmitted, the chrominance information of both scan lines is added together to provide a single chrominance signal, modulating a chrominance subcarrier which is added to the luminance-summation signal which modulates the channel RF carrier. The bandwidth required for transmission of this increased vertical-resolution signal is substantially identical with the bandwidth required for transmission of a signal in accordance with the present standards.

At a television receiver, the luminance carrier is synchronously quadrature demodulated to obtain the summed luminance information in a first channel and the difference luminance information in a second channel. The first and second channels are respectively added to and subtracted from one another to derive the luminance information for the first and second respective lines of the scan line pair, in the high-definition receiver. In a normal standard receiver, the luminance carrier is normally amplitude detected, and the luminance sum information is utilized to display a standard-resolution picture.

In presently preferred embodiments, the increased vertical-resolution signals are generated by superimposing either a high frequency sampling signal or a horizontal-frequency square waveform signal onto the vertical camera scanning waveform. In the former case, the video information is sampled at the negative and positive peaks of the superimposed sinusoidal waveform, is held between samples, and filtered to provide the HRTV video information. In the latter case, one of the pair of lines is produced for each square wave half-cycle and four-line storage of video is required to provide the HRTV video information.

Increased horizontal-resolution signals are generated with increased bandwidth for transmission over a double-normal-bandwidth channel arrangement. In one presently preferred embodiment, additional chroma resolution may be provided simultaneously therewith, by use of a second chroma subcarrier in the relatively broad lower channel sideband. The increased horizontal resolution, with or without increased chroma resolution, signal can be combined with either increased vertical resolution signal (which may then have an even wider bandwidth and provide even greater detail) to provide a compatible signal with increased vertical, horizontal and/or chroma resolution.

In another presently preferred embodiment, increased horizontal resolution is provided by use of a horizontal interlace, wherein a high-definition camera waveform is alternately sampled at alternating ones of a multiplicity of pairs of sampling points along each horizontal scan line, in different ones of a sequential pair of frames. Each frame is transmitted in the normal frame interval, whereby gross detail information is received at the normal (1/30 second) frame rate, and fine horizontal detail information is received at one-half of this frame rate with 1/15 of a second changes. This horizontal interlace method for increasing horizontal resolution can be utilized with either method for increasing vertical resolution, and can also be utilized with a chroma edge-sharpening technique for increasing chroma resolution.

In a presently preferred method for increasing color resolution by sharpening of the chroma waveform edges, the transmitted luminance edge information is detected and utilized to improve the significantly lower color resolution, whereby color information will be transferred from the luminance signal. Specifically, a pair of correction voltages are generated from the luminance signal to provide waveforms correcting the amplitude and polarity of each of the color-I and color-Q signals. This color edge-correction method can be utilized with either increased-vertical-resolution method or with either increased-horizontal-resolution method, to provide a total high-resolution picture.

Accordingly, it is an object of the present invention to provide a novel system for transmission of high-resolution television signals which are compatible with existing resolution television standards.

This and other objects of the present invention will become apparent upon consideration of the following detailed description, when read in conjunction with the drawings.

BRIEF DESCRIPTION OF THE DRAWINGS

FIG. 5 is a schematic block diagram of circuitry utilized in a television camera for providing adjacent line video information when the method illustrated in FIGS. 4a–4c is used;

FIG. 5a is a set of related shift register clock waveforms, useful in understanding operation of the circuitry of FIG. 5;

FIGS. 7a and 7b are block diagrams of portions of HRTV receivers for displaying HRTV signals produced by the methods of FIGS. 4a–4c and FIGS. 2a–2d, respectively;

DETAILED DESCRIPTION OF THE INVENTION

Figure 1A:
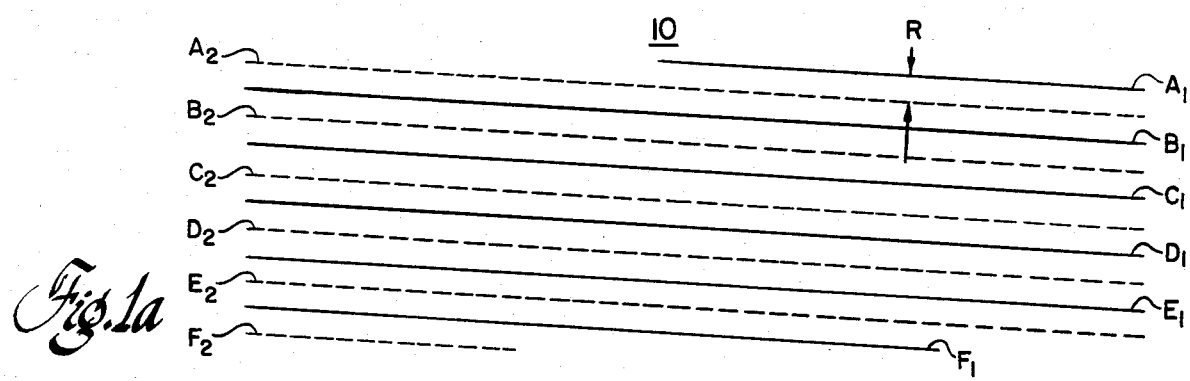
FIGS. 1a and 1b are representations of a portion of a television raster with, respectively, an interlaced standard scan and an interlaced double scan in accordance with the principles of the present invention.
Figure 1B:
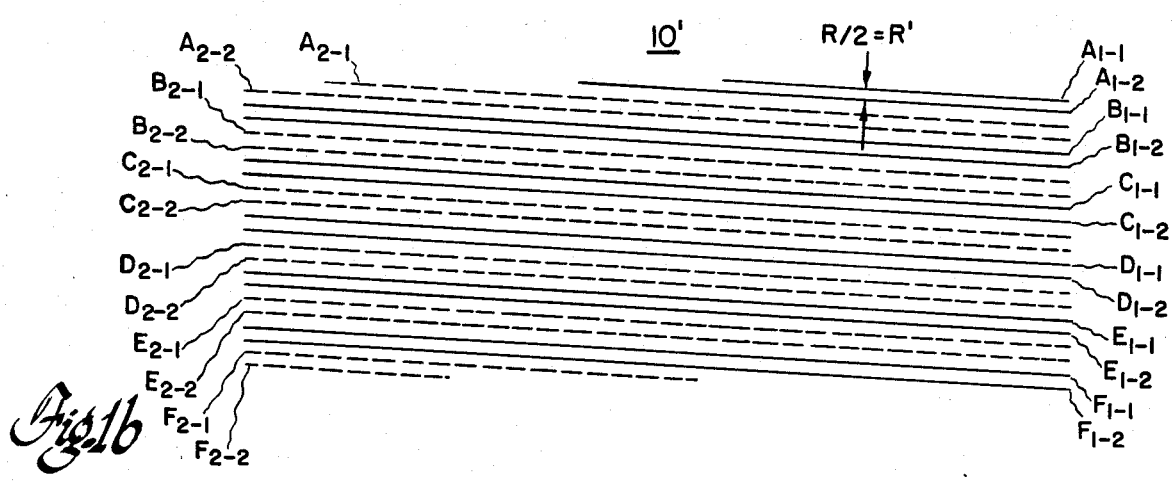
Figure 2A:
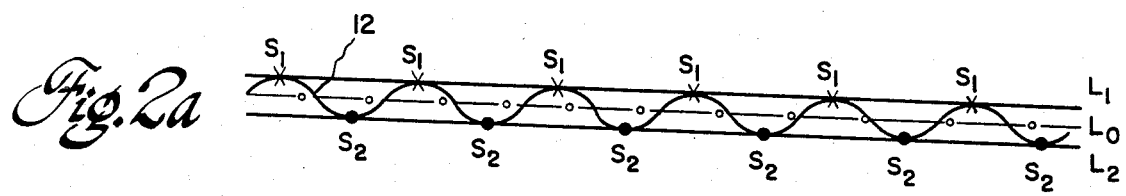
FIGS. 2a–2d are waveforms illustrating one method for substantially simultaneously scanning a pair of horizontal scan lines, in accordance with the principles of the present invention.
Figure 2B:
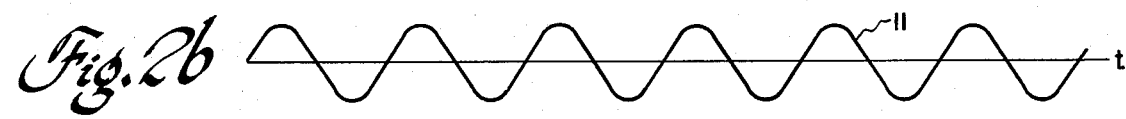
Figure 2C:
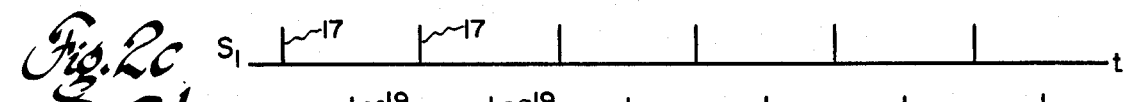
Figure 2D:
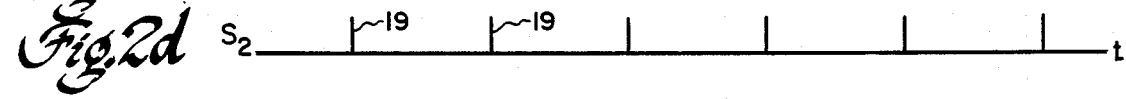

Referring initially to FIGS. 1a and 1b, my high-resolution television (HRTV) system is compatible with present TV standards (e.g. the NTSC standard in the United States) and uses basically the same line and frame scanning rates, the same color subcarrier frequency (e.g. about 3.58 MHz. in the United States) and sound transmission frequency (e.g. about 4.5 MHz. in the United States). My HRTV system can transmit more fine detail in either, or both, of the vertical and horizontal dimensions. As will be explained in more detail hereinbelow, horizontal high-resolution transmission can, for example, be achieved, in a compatible manner, by utilization of a greater channel bandwidth; present TV receivers will simply reject the added information and still provide a picture of present-day quality. The vertical resolution, however, is completely determined by the scan rates utilized in the particular transmission standard; as these rates do not change, the rates would normally set an upper limit to the vertical resolution of the picture. For example, in the NTSC system, the picture raster scan contains 525 scan lines. In a HRTV system, the number of lines should be at least 1,000. I have found that the vertical resolution can be effectively doubled, to a vertical resolution of 1050 lines using the NTSC transmission standards, by scanning and transmitting two scan lines at once, using the standard scan rates. While the following description will use the NTSC standards and numbers, it should be understood that my system and methods apply equally as well to other standards, such as the PAL or SECAM standards and the like, which require a mere change of numerical constants for scan rates, bandwidth and the like.

The standard interlaced scan raster is illustrated in FIG. 1a. It should be understood that only a portion of the raster is shown, for simplicity, and that that portion is not drawn to scale. As is well known, the standard interlaced scan provides one-half of a frame (of 262.5 horizontally scanned lines) in a one-half-frame time (1/60th second) interval, with each alternate half-frame scan starting with an offset of one-half the frame width. Thus, in the first half of a frame, a first scan line $A_1$ begins at approximately the top middle of the raster and is swept rightwardly to the right edge of the raster. Additional first half-frame scan lines $B_1$–$F_1$ are then sequentially swept from one edge of the raster to the other (e.g. from left to right, as viewed on a TV screen). During line scanning, at the horizontal scan rate of about 15,750 lines per second, the vertical position of the lines is continually moved downward in the raster, whereby the start of one scanning line is at a lower position than the end of the previous scan line. After scanning a first half-frame (lines $A_1$–$F_1$), the second half-frame commences with the first line being offset by half of the raster width, such that the first line $A_2$ of the second half-frame starts at the edge of the raster. Due to the substantially constant horizontal and vertical speeds of the spot sweeping out the lines, the half-width offset causes the second-half-frame lines $A_2$–$F_2$ to be interlaced in between the first-half-frame scan lines $A_1$–$F_1$, and with some resolution distance R between adjacent scan lines, e.g. lines $A_1$ and $A_2$, in the total frame.

In accordance with one aspect of my invention, as illustrated in FIG. 1b, the vertical resolution is doubled, and the resolution distance R' is reduced to a value R/2, by utilizing an adjacent pair of scan lines in place of each single scan line of the normal-resolution raster. Each of the pair of scan lines is offset in an opposite direction from the position which would be taken by the single scan line of the normal-resolution raster. Thus, in the first-half-frame, the half-raster-width scan line $A_1$ (of FIG. 1a) is replaced by a pair of adjacent scan lines $A_{1-1}$ and $A_{1-2}$, respectively vertically offset slightly above and slightly below the path which normal scan line $A_1$ would take. Similarly, the first-half-frame scan line pairs $B_{1-1}$ and $B_{1-2}$ through $F_{1-1}$ and $F_{1-2}$ are substituted for each of the single normal-resolution scan lines $B_1$–$F_1$. During the second-half-frame, the pair of scan lines $A_{2-1}$ and $A_{2-2}$ are utilized in place of single scan line $A_2$ in the normal resolution raster. Similarly, the line pairs $B_{2-1}$ and $B_{2-2}$ through $F_{2-1}$ and $F_{2-2}$ are utilized in place of raster lines $B_2$–$F_2$, respectively, in the normal-resolution raster scan. As in the first-half-frame, the second-half-frame line pairs are displaced slightly above and slightly below the path which would have been taken if a single normal-resolution line were to be used. It will be seen that the number of horizontal scanning lines, defining vertical resolution, is thus doubled. While it is theoretically possible to replace each single normal-resolution scan line with N scan lines, where N is an integer greater than 1, and thus multiply the resolution by the integer factor N, the use of $N=2$ is presently preferred, as being capable of transmission in a compatible manner with normal-resolution receivers, as will be hereinbelow described.

The HRTV signal begins at the TV camera, which must have a sufficiently high resolution, bandwidth and signal-to-noise ratio to be used in an HRTV system. An HRTV camera must have a scanning system and a video amplification system which is modified, relative to the scanning and video amplification systems presently in use, to provide for scanning a pair of scan lines at substantially the same time. Each of two presently preferred methods will be described, based upon the assumption that a color camera is being utilized, with a separate single-beam camera tube being used for each of the three primary colors. It should be understood that the principles of the following pair of exemplary methods can be equally as well adapted to monochrome cameras or to single-tube color cameras.

Figure 3:
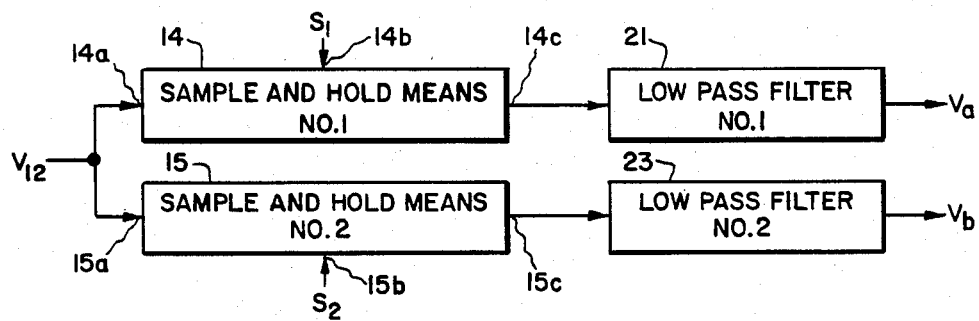
FIG. 3 is a schematic block diagram of a portion of a transmitter for providing first and second line information in a television camera utilizing the high frequency sampling method of FIGS. 2a–2d.

Referring now to FIGS. 2a–2d and FIG. 3, in a first method for producing a high-vertical-resolution video signal, a pair of adjacent lines are scanned at substantially the same time by the addition of a high frequency sinusoidal waveform 11 (FIG. 2b) to the normal vertical scan sweep waveform. The amplitude of sinusoidal waveform 11 is adjusted such that, as the beam in the camera tube (which may be a vidicon and the like) is swept in the scanning direction, e.g. horizontally from left to right in FIG. 2a, and is slowly moved in the orthogonal (vertical) direction, the beam 12 position is sinusoidally vertically deflected to peak positions along upper line $L_1$ and lower line $L_2$, substantially equally and oppositely displaced about the normal-resolution single scan line $L_0$ (shown in chain line). By adjustment of the amplitude of high frequency sinusoidal waveform 11, the peak deviation of scanning beam 12 can be made to coincide with upper and lower lines $L_1$ and $L_2$ at opposite polarity peaks of each cycle of waveform 11. The video waveform $V_{12}$ from the camera tube is provided to the input 14a and 15a of each of first and second sample-and-hold means 14 and 15 (FIG. 3). A first strobe waveform $S_1$ (FIG. 2c) provides, to a strobe input 14b of first sample-and-hold means 14, each of a sequence of strobe signals 17 occurring essentially at each positive-polarity peak of waveform 11, corresponding to those instances at which the camera scanning beam 12 is deflected to points along upper line $L_1$, which points are indicated by small x's labeled $S_1$ in FIG. 2a. A second strobe signal $S_2$ is provided to a strobe input 15b of the second sample-and-hold means 15, with each of the sequence of strobe signals 19 occurring essentially at each negative-polarity peak of waveform 11, corresponding to those instances at which the camera scanning beam 12 is deflected to points along lower line $L_2$, which points are indicated by small dots labeled $S_2$ in FIG. 2a. Thus, the video value of upper line $L_1$ and lower line $L_2$ are sequentially sampled, and held until the next sample for that line, at a rate set such that the sample positions are relatively close to one another and consistent with the desired horizontal resolution. The sampled and-held values for lines $L_1$ and $L_2$ are respectively provided at outputs 14c and 15c and are then band-limited by a respective one of lowpass filters 21 and 23 to remove sampling waveform components.

In summation of the first method for producing increased vertical-resolution video, the single output of each camera tube, consisting of the video information of two adjacent lines time-shared at a high sampling frequency, is processed by a signal separation circuit in the video amplification chain in order to separate the two line signals and remove the sampling frequency components. Illustratively, the signal separation circuit utilizes a pair of analog sample-and-hold circuits synchronized to alternate peaks of the high frequency deflection waveform 11 and followed by associated lowpass filters to define the video bandwidth and remove the sampling frequency components. The output of the circuit of FIG. 3 has each of two simultaneously-time-adjacent lines of full-bandwidth video data $V_a$ and $V_b$ on a different one of two separate video transmission lines. The deflection system producing oscillating scan beam 12, and the signal separation circuit of FIG. 3, must be used for each of the three camera tubes commonly utilized for providing the three primary color (red, blue and green) video information in a color camera. The result is a total of six video signals (a pair of $V_a$ and $V_b$ signals for each of the three colors), simultaneously available in time and each independently available on a separate transmission line for subsequent processing.

Figure 4A:
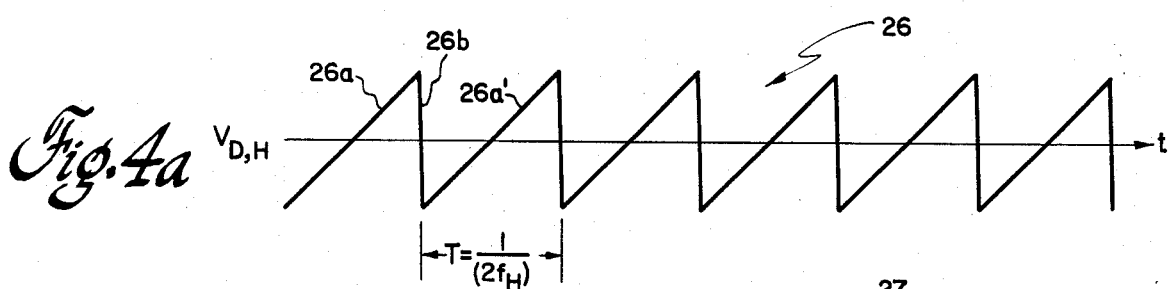
FIGS. 4a–4c are representations of the waveforms and raster utilized in another method for providing increased vertical resolution signals from a TV camera.
Figure 4B:
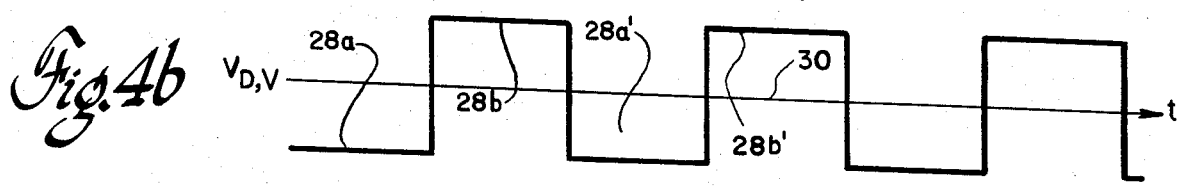
Figure 4C:
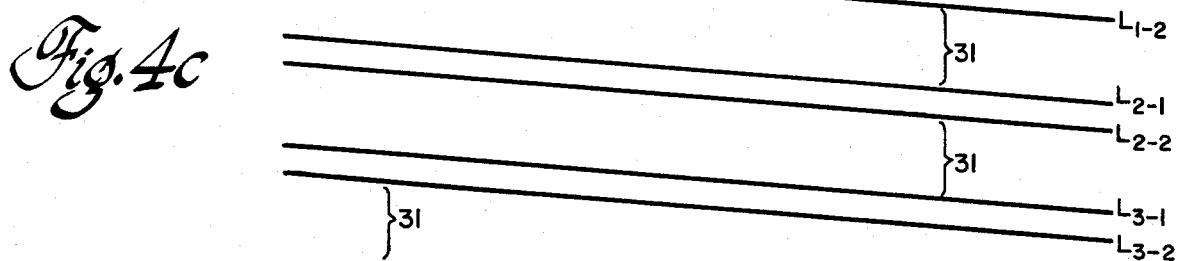

Referring now to FIGS. 4a–4d and FIG. 5, another presently preferred method, for substantially simultaneously generating video information from each of an adjacent pair of scan lines, obviates the need for the high-frequency sinusoidal waveform and the pair of high-frequency sampling strobes. In accordance with this method of generating the pair of line video signals, a double-frequency horizontal scanning signal $V_{D,H}$ waveform 26 (FIG. 4a) is generated. Waveform 26 has the well-known scan sawtooth shape with a relatively slowly increasing leading edge 26a, having a shape established for substantially linear scanning of the camera tube electron beam along a line, and with a relatively rapid trailing edge 26b for retracing the spot to begin the next scanning line portion 26a'. In contrast to the normal-resolution horizontal deflection scan waveform, waveform 26 has a period T, between identical points on a pair of adjacent waveforms, equal to half the normal horizontal scan interval H, e.g. about one-half of H=63.5 microseconds, and thus has a frequency double the normal horizontal frequency and equal to 2/H. This double-frequency (approximately 31.5 KHz. for NTSC standards) horizontal scanning waveform 26 causes generation of two lines, when the vertical scanning waveform 27 has a normal-horizontal-frequency $f_H$ square waveform 28 superimposed upon the vertical sawtooth scan signal $V_{D,V}$ waveform 27 (of which only a portion is shown in FIG. 4b) for use in the vertical deflection circuit of the camera. The composite vertical scan and double-frequency horizontal waveforms will cause the camera beam to trace out a first complete horizontal line $L_{1-1}$ (FIG. 4c) responsive to portion 26a, which is offset slightly below the position of a single-line scan, due to the addition of waveform portion 28a to the vertical deflection waveform. Thereafter, the second complete horizontal line $L_{1-2}$ is responsive to the next subsequent horizontal scan waveform leading edge 26a' portion, but is now offset slightly above the single-line-position, of what should be the next single-line scan, due to the offset provided to the vertical scan waveform by the opposite-polarity square wave portion, e.g. positive-polarity square wave half-cycle portion 28b. Thus, there are provided scan waveforms which deflect the camera scanning beam along a pair of lines parallel to, but separated from, each other, to provide two sequential lines of camera video data. It will be seen that this process repeats, such that during the next square wave negative-polarity portion 28a', the upper line $L_{2-1}$ of the next line pair is scanned and then the waveforms cause scanning of the lower line $L_{2-2}$, during positive-polarity portion 28b'. Similarly, during subsequent cycles of the square waveform 28, additional pairs of scan lines (e.g. line pairs $L_{3-1}$, and $L_{3-2}$, $L_{4-1}$ and $L_{4-2}$, and so forth) are scanned.

Figure 4D:
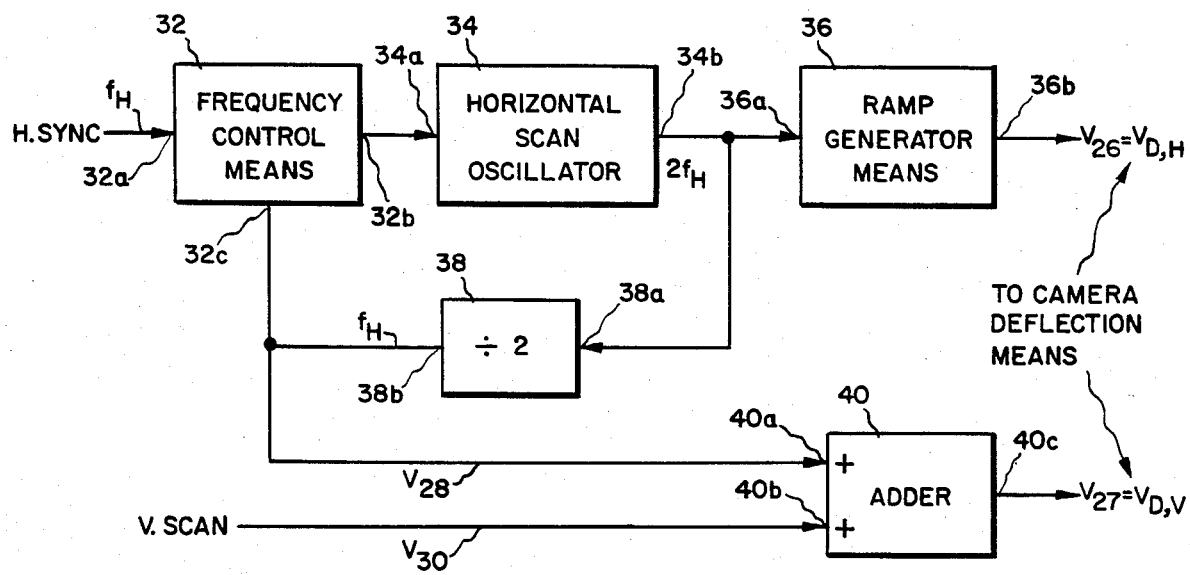
FIG. 4d is a block diagram of circuitry biased for generating the horizontal and vertical scan waveforms of FIGS. 4a and 4b, respectively.

The horizontal and vertical scanning waveforms 26 and 27 can be generated utilizing a circuit such as shown in FIG. 4d. A normal-horizontal-frequency $f_H$ synchronization waveform is applied to one input 32a of a frequency control means 32, having an output 32b connected to a control input 34a of a horizontal scan oscillator means 34 for controlling the frequency thereof. The signal at output 34b of the oscillator means is controlled to a frequency ($2f_H$) twice that of the normal horizontal oscillator, and is applied to both the input 36a of a ramp generator means 36 and the input 38a of a frequency divide-by-2 means 38. The twice-horizontal-frequency waveform applied to ramp generator means input 36a causes the ramp generator 36 to provide the twice-horizontal-frequency ramp waveform $V_{26}$ (of FIG. 4a) at output 36b for use in providing the horizontal deflection waveform $V_{D,H}$. The normal-horizontal-frequency $f_H$ waveform at the divider means output 38b is applied to another input 32c of the frequency control means 32, for comparison against the horizontal synchronizing frequency of the waveform provided at first input 32a, for control of the oscillator frequency input 34a voltage. The divider output 38b waveform is the normal-horizontal-frequency square waveform 28 and is applied to a first input 40a of a waveform adding means 40. The normal vertical scan waveform $V_{30}$ is coupled into another input 40b of the waveform adding means. Adding means 40 adds the two input waveforms 28 and 30 to provide the composite waveform 27 signal $V_{30}$ at an output 40c thereof, for use in providing the vertical deflection waveform $V_{D,V}$.

The ramp/square-waveform composite scanning method requires additional circuitry 42 (FIG. 5) for storing video information from the four sequential scan lines of two sequential line pairs. The four line-store circuit 42 is somewhat similar in principle to that described by J. J. Tiemann in co-pending application Ser. No. 383,067, filed May 28, 1982, now U.S. Pat. No. 4,473,837, issued Sept. 25, 1984, assigned to the assignee of the present application and incorporated herein by reference in its entirety. Circuit 42 is utilized to generate two simultaneous separate video data outputs $V_a$ and $V_b$ at the normal horizontal line rate, e.g. 15.75 KHz., responsive to the twice-normal-line-rate video data provided by each camera tube by the use of the method and circuitry of FIGS. 4a–4e. Thus, after camera tube scanning with waveforms 26 and 27 and subsequent video amplification, the video data is digitized by an analog-to-digital converter ADC means 43. Each line of video is digitized into a multiplicity, e.g. about 910, of N-bit data words, where N is commensurate with a desired level of brightness resolution. The output of ADC 43 is coupled through a single-pole, four-throw switch means 45 to one of four line storing means 46–49. Switching means 45 has four selectable output terminals 45a–45d, selectably coupled to a common input terminal 45e receiving the digitized video data. Common terminal 45e is sequentially coupled to the output terminals 45a, 45b, 45c, 45d, 45a and so forth, at twice the normal horizontal frequency ($2f_H$) rate. The first switch means 45 may be commutatively stepped by the horizontal scan oscillator output 34b waveform of FIG. 4d.

Each of the four line-storing means 46–49 is a serial shift register having a large number of N-bit-wide stages. A single scan line of data is applied to the input 46a–49a, respectively, of each storing means shift register for each connection of switching means common terminal 45e to the associated one of output terminals 45a–45d, and is clocked into the storing means shift register responsive to clock pulses provided at the associated one of the clock inputs 46b–49b thereof by an associated one of four clock generators 50-1 through 50-4. Each clock generator 50, e.g. representative clock generator 50-4, includes a switch means 51 receiving clock input pulses at a first selectable terminal 51a at eight times the chroma frequency $f_c$ (which is approximately 3.579545 MHz. when the NTSC standards are utilized). A frequency divide-by-two means 52 provides clock pulses at four times the chroma frequency to a second selectable terminal 51b. The output 51c of each switching means is gated through a two-input AND gate, receiving one of n=4 enable EN,n signals to provide the associated one of the n=4 storing means clock$_{clk,n}$ signals. Each clock generator 50 provides, responsive to the associated switching $f_{s,n}$ signal and the associated enable EN,n signal, a first clock signal portion at a clock frequency of 8fc (or about 28.64 MHz.) to clock video data into the approximately n=910 stages of each of the storage register line storing means 46–49, in synchronism with the connection of the output of ADC 43 to the input of that storing means, via switching means 45. That one of the storing means associated with the other line of that pair is not then clocked, responsive to a logic zero level at the EN,n input of the gate 53 of the associated clock means. After both storing means for a first line pair are sequentially filled, and while the second line pair storing means are being sequentially filled, the first line pair storing means are read out in parallel by clock pulses at one-half the input-store frequency, e.g. at $4f_c$ or about 14.32 MHz. As shown in FIG. 5a, in a first half-horizontal-time interval (from time $t_0$ to time $t_1$), the clock means 50-1 associated with the first line $L_{1-1}$ storing means 46 receives a switching $f_{S,1}$ signal causing output terminal 51c to be connected to input terminal 51a, and also receives an enable EN,1 signal at the logic 1 level, to provide the higher frequency (e.g. $8f_c$) train of clock pulses to input 46b; storage of the multiplicity of digitized signals for the first line occurs, as switch means 45 connects input 45e to first line output terminal 45a. During the same time interval, the switch means 50-2 associated with the second line storing means 47 receives an enable EN,2 input signal of logic 0 level and does not provide clock signals to clock input 47b. Similarly, during this time interval, the clock means 50-3 and 50-4 respectively associated with the respective third and fourth line storing means 48 and 49 both receive logic 1 level enable signals and a switching control $f_{s,3}$ or $f_{s,4}$ signal connecting output 51c to input 51b. Accordingly, the pair of line storing means 48 and 49 are readout at the lower frequency (e.g. $4f_c$). In the second half-horizontal-time interval (from time $t_1$ to time $t_2$) switch means 45 has operated to connect input terminal 45e to output terminal 45b; as the second line $L_{1-2}$ information from the first line pair is now to be read into the second line storing means 47, the clock means 50-2 associated therewith is enabled to provide the higher-frequency ($8f_c$) clock signal to input 47b. As the first line information in line storing means 46 is to be held during this time interval, the enable EN,1 signal is switched to the logic 0 level, to prevent clock pulses from being applied to clock input 46b from the associated clocking means 50-1. The lower-frequency ($4f_c$) clock signals continue to be applied to the third and fourth line storing means clock inputs 48b and 49b.

The entire first line pair digitized video information is now stored in first and second line storing means 46 and 47 and is read out during third and fourth half-horizontal-time intervals (from time $t_2$ to time $t_3$, and from time $t_3$ to time $t_0'$, respectively) by applying the appropriate enable signal to gate 53 and by causing the associated switching means 51 to connect output terminal 51c to input terminal 51b, in each of the clock means 50-1 and 50-2 associated with first and second storing means 46 and 47. While the first line pair information is being read out, the second line pair information is sequentially being stored in third and fourth line storing means 48 and 49. Thus, during the third time interval from time $t_2$ to time $t_3$, the clock pulses to fourth line storing means clock input 49b are disabled, while the clock pulses to third line storing means 48b are applied at the higher-frequency ($8f_c$) rate, with switching means 45 connecting the output of ADC 43 to terminal 45c and the third storing means input. In the fourth time interval, the third line storing means enable EN,3 signal is at a logic 0 level, preventing clock pulses from appearing at input 48b, while the higher-frequency clock pulses are applied to clock input 49b, with switching means 45 connecting the output of ADC 43 to terminal 45d and the fourth storing means input.

A second switching means 54 is of double-pole, double-throw configuration, having a first output common terminal 54a commutated between first and second input terminals 54b and 54c, and a second common output terminal 54d commutated between third and fourth input terminals 54e and 54f. Input terminal 54b is connected to first line storing means output terminal 46c, while input terminal 54c is connected to third line storing means output 48c. Similarly, switch input terminal 54e, which would be connected to the associated output when input terminal 54b is connected to output terminal 54a, is connected to second line storing means output 47c and remaining input terminal 54f is connected to fourth line storing means output 49c. The connection of switch outputs 54a and 54d to inputs 54b and 54e or to inputs 54c and 54f, respectively, is commutated at the normal horizontal frequency $f_H$, as may be realized by driving switching means 54 with the waveform available at either input 32a or 32c of the frequency control means of FIG. 4d. The pair of digitized line signals are then converted back to analog information by an associated one of digital-to-analog converter (DAC) means 55 or 56. The two simultaneous but separate video data streams at the DAC outputs (for the upper and lower scan lines of each line pair) are independently lowpass filtered by first and second lowpass filters 57 or 58, to provide the two independent video signals $V_a$ and $V_b$ for each of the three camera tubes in the color camera.

In summation, the second method of generating a high-vertical-resolution video signal utilizes a vertical composite waveform formed by the addition of a low amplitude normal-horizontal-frequency square wave to the normal-vertical-frequency scan sawtooth waveform and a twice-normal-horizontal-frequency line scan waveform. These deflection waveforms cause a pair of lines close to each other to be scanned while opening up spaces 31 therebetween (see FIG. 4c), which open spaces 31 are filled in during the second half of each frame, due to the phase reversal of the square wave caused by the odd number of lines in each field. The video information from the camera is sequential and at twice the normal line rate and requires the use of circuitry 42 to digitize and read a first line, e.g. line $L_{1-1}$, into a first line-storing means at the twice-normal rate. The other line, e.g. $L_{1-2}$ of the line pair, is then digitized and read into the next line-storing means number 2. A first line of a next line pair, e.g. line $L_{2-1}$, is digitized and read into a third line-storing means and the remaining line, e.g. $L_{2-2}$ of the second pair is digitized and read into a fourth line-storing means. While the data words for the second pair of scan lines are being read into the third and fourth line-storing means, the data words from the first two lines are being read out of the first and second line-storing means at normal scan rates, converted back to analog signals, lowpass filtered and made available, at separate video outputs from the camera, as a pair of video signals substantially identical to those video output signals provided in accordance with the first method (see FIG. 3).

It should be understood that this second method is described for a digital implementation but that an analog implementation, using CCD-type clocked delay lines and the like, can be equally well utilized. It should also be understood that, although shown in FIG. 4d as adding square waveform 28 in the second method, adder 40 can be equally as well utilized for adding the high frequency sinusoidal waveform 11 (FIG. 2b) to the vertical scan sawtooth waveform as required by the first method discussed hereinabove. The additional vertical deflection signal component, either a high frequency sine wave or horizontal frequency square wave, can also be added directly to a vertical magnetic deflection portion of the camera yoke with an additional deflection winding. As the additional deflection amplitude is relatively small, additional vertical deflection plates can be utilized in an appropriate location, either internal or external to the camera tube, to electrostatically add this small deflection component; the electrostatic component addition may be preferable to minimize electromagnetic interference problems.

Figure 6:
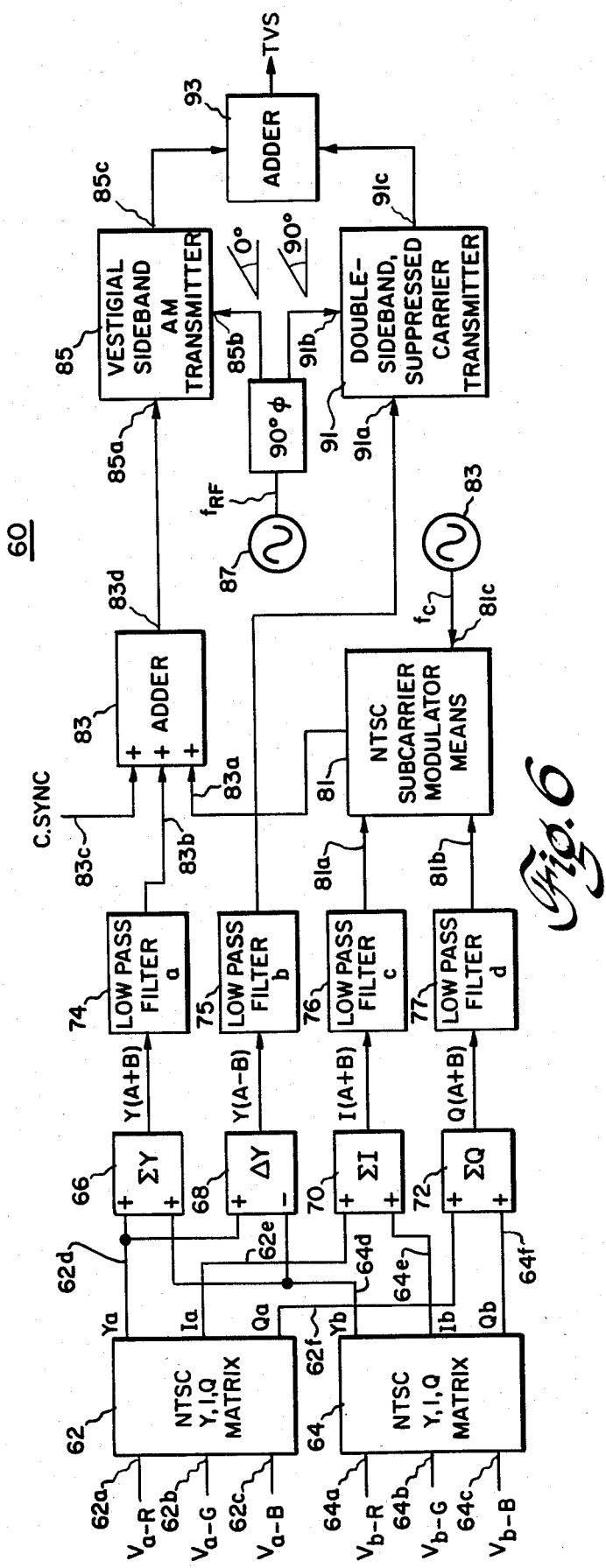
FIG. 6 is a schematic block diagram of the matrixing and signal combination means and carrier modulating means utilized at the transmitter for providing an HRTV RF carrier for transmission to receivers.
Figure 6A:
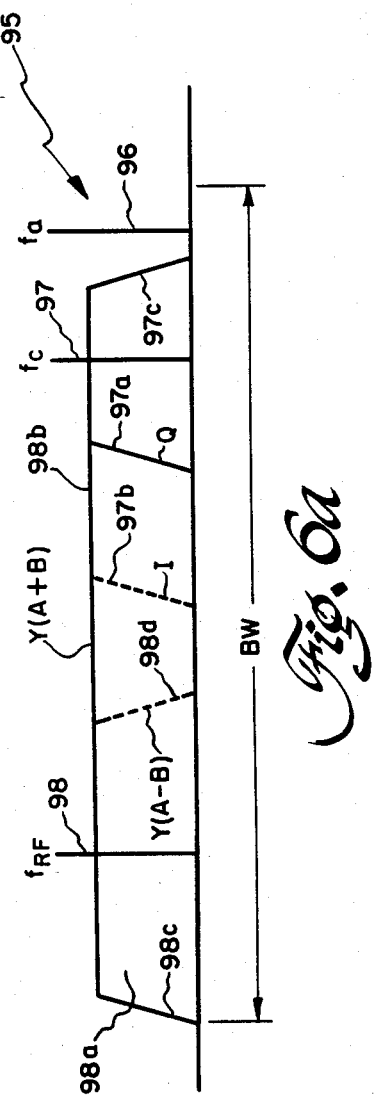
FIG. 6a is a graphical representation of the frequency spectrum of a transmitted high-vertical resolution color signal.

Referring, now to FIGS. 6 and 6a, the three sets of line pair signals, provided in a color camera at the output of three identical circuits of the type shown in either FIG. 3 or 5, are utilized to transmit an HRTV signal to a receiver. The transmitter 60 (FIG. 6) thus receives first line red, green and blue waveforms ($V_{a\text{-}R}$, $V_{a\text{-}G}$ and $V_{a\text{-}B}$) and second line red, green and blue signals ($V_{b\text{-}R}$, $V_{b\text{-}G}$ and $V_{b\text{-}B}$). The three color signals for each line are routed to the red, green and blue inputs 62a, 62b and 62c or 64a, 64b and 64c of an associated one of a pair of transmitting matrices 62 and 64. Illustratively, matrices 62 and 64 are the standard NTSC Y, I, Q, matrix known to the art. Each matrix combines the three color video signals to provide a luminance $Y_a$ or $Y_b$ signal at an associated output 62d or 64d and either a pair of color signals $I_a$ and $Q_a$ at first matrix outputs 62e and 62f, respectively, or a pair of color signals $I_b$ and $Q_b$ at second matrix outputs 64e and 64f, respectively. The pair of luminance signals $Y_a$ and $Y_b$ are added together in a first adder 66 to provide an additive-luminance signal $Y(A+B)$. The second luminance signal $Y_b$ is subtracted from the first luminance $Y_a$ in a subtractor 68 to provide the difference-luminance signal $Y(A-B)$. The two I color signals are added together in a second adder means 70 to form a summed-I color $I(A+B)$ signal, while the other color components $Q_a$ and $Q_b$ are added together in a third adder means 72 to form a summed-Q color signal $Q(A+B)$. Because the human eye cannot resolve fine color detail, standard NTSC vertical color resolution is entirely acceptable in a double-vertical resolution system, for the same reasons that restricted horizontal color resolution is acceptable in a standard NTSC transmission. Therefore, an HRTV image need not distinguish chroma information on a line-by-line basis with a line pair format, and color-difference signals are not required. Thus, the six video signals from the camera are now reduced to four video signals: three summation signals $Y(A+B)$, $I(A+B)$ and $Q(A+B)$, and a luminance-difference signal $Y(A-B)$. The three summation signals are identical to those generated by a standard-resolution NTSC camera-video chain, before band limiting is applied. The difference signal $Y(A-B)$ represents the added information necessary for doubling the vertical resolution utilizing the NTSC standard.

Assuming that standard NTSC horizontal resolution is employed, the four video signals are now modulated onto the transmission RF carrier, at the transmission channel frequency $f_{RF}$. Methods for increasing the horizontal resolution will be described hereinbelow, but, it should be understood, need not be utilized to provide a signal for receiving a picture with increased vertical resolution.

The four video signals are each individually lowpass filtered by an associated one of lowpass filter means 74–77. Typically, for an NTSC signal, the lowpass filters 74–77 have cutoff frequencies of about 4.2 MHz., about 1.25 MHz., about 1.5 MHz. and about 0.6 MHz., respectively. The lowpass-filtered summed-I and summed-Q signals are coupled to first and second inputs 81a and 81b of a subcarrier modulator means 81; a chroma frequency $f_c$ oscillator means 83 is coupled to another input 81c of the subcarrier modulator means. In the NTSC illustrative example, oscillator 83 produces the approximately 3.58 MHz. chroma carrier. The modulated chroma subcarrier produced in means 81 is coupled from the output 81d thereof to a first input of a signal adder means 83. The lowpass-filtered summed-Y signal $Y(A+B)$ is provided to a second adder input 83b and a composite vertical/horizontal synchronication C.SYNC signal (obtained by known means, not shown) is coupled to a third adder input 83c. The signal at adder output 83d is a fully-compatible NTSC video color signal, and is presented to the modulation input 85a of a vestigial sideband A.M. transmitter 85. A channel oscillator 87 provides the TV carrier frequency through a phase shift network 89. The carrier frequency $f_{RF}$ signal, with a 0° phase shift, is provided to the carrier input 85b of the transmitter means 85, is modulated therein by the composite video from input 85a and appears as a vestigial sideband, video-modulated signal at transmitter output 85c. The lowpass-filtered luminance difference signal $Y(A-B)$ is coupled to the modulation input 91a of a double-sideband, suppressed carrier transmitter means 91, receiving the channel frequency $f_{RF}$ signal from phase shift means 89, at a 90° phase relative to the phase of the carrier signal provided to transmitter means input 85b. The transmitter output 91c provides a double-sideband, suppressed carrier signal at the channel frequency and having the band-limited difference-luminance information contained in the modulation sidebands thereof. This signal is in phase-quadrature with the signal from transmitter means output 85c, and is added thereto in an adder means 93, to provide the total high-resolution, compatible television signal TVS for transmission to the viewer.

Thus, the HRTV compatible signal is transmitted about a channel carrier frequency $f_{RF}$ with a maximum bandwidth BW (FIG. 6a) within the presently-imposed limits, e.g. 6 MHz. in the United States. A sound carrier is added by known means (not shown) so that the TVS signal 95 includes a frequency-modulated sound carrier signal 95 at frequency $f_a$ (approximately 4.5 MHz. above the channel frequency $f_{RF}$). A chroma subcarrier 97 at a frequency $f_c$ (approximately 3.58 MHz. above the channel frequency $f_{RF}$ for the NTSC signal) has the color Q information contained in sidebands 97a thereof, with a lower sideband limited to about 3 MHz. above the channel frequency and with the lower sideband 97b for the color I information limited to a frequency of about 2.1 MHz. above the channel frequency. Both the I and Q upper sideband signals 97c are limited to a frequency of about 4.2 MHz. above the channel carrier. The summed-luminance signal $Y(A+B)$ components are contained in the vestigial lower sideband 98a (extending to about 1.25 MHz. below the channel carrier) and with a full upper sideband 98b extending out to about 4.2 MHz. above the channel carrier 98. The difference-luminance signal $Y(A-B)$ signal is band-limited in both lower and upper sidebands 98c and 98d, to a degree determined by the frequency limitations of the vestigial lower sideband 98a, e.g. about 1.25 MHz. either side of the channel carrier, and is in phase-quadrature with at least the summed-luminance modulation.

Figure 7A:
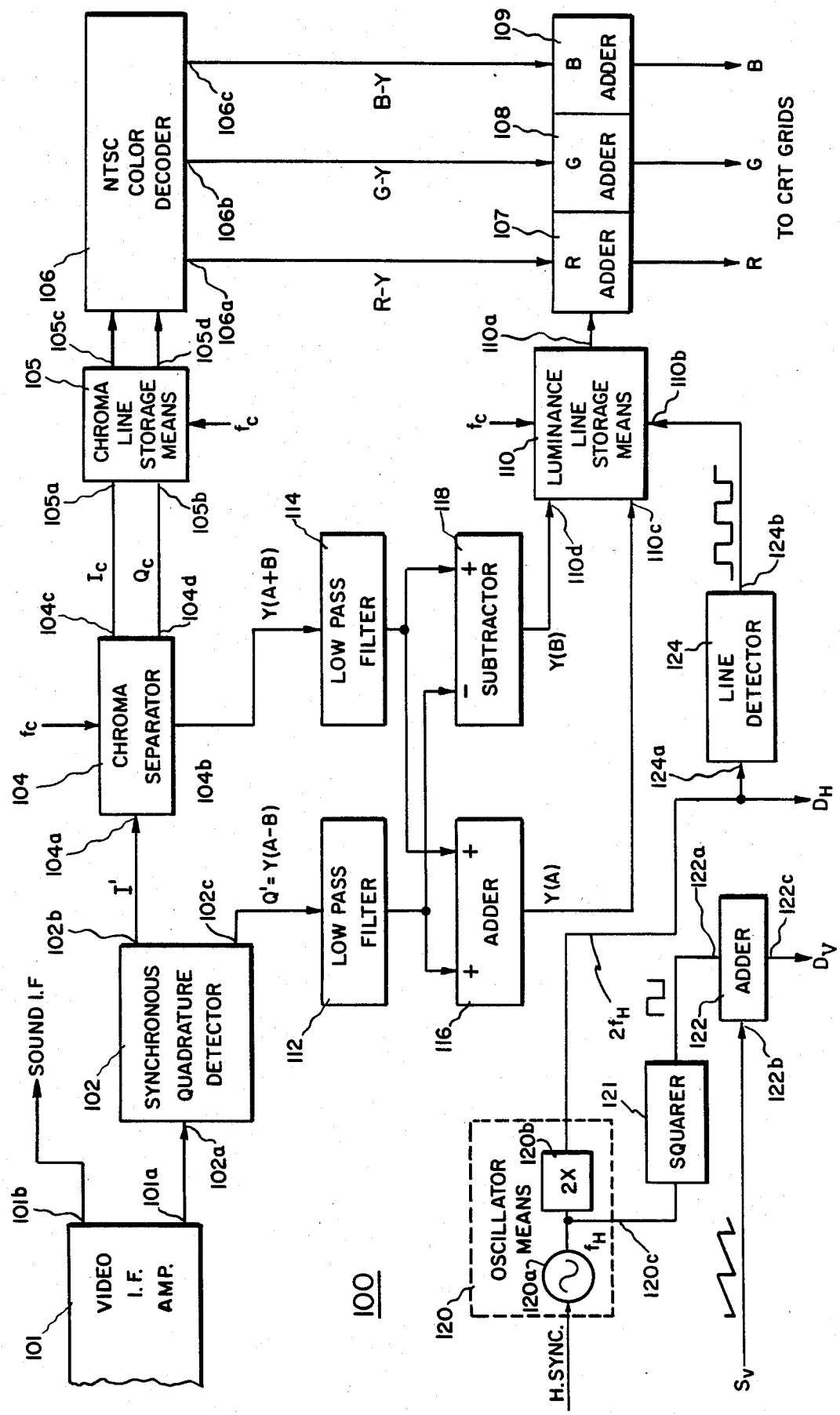

It will be seen that a normal-resolution color TV receiver will, upon being tuned to the channel carrier 98: detect the sound and chroma subcarriers 96 and 97, respectively, at frequencies $f_a$ and $f_c$, respectively; demodulate the color I and Q signals and the summed-luminance signal Y(A+B) therefrom; and provide a normal-resolution color picture. The HRTV signal requires a receiver having circuitry 100, as shown in FIG. 7a, and a high-resolution-capability cathode ray tube, for display of the increased-vertical-definition picture. The normal tuner (not shown) and full-bandwidth video intermediate-frequency (I.F.) amplifier 101 are utilized to provide the video I.F. signal to the input 102a of a synchronous quadrature second detector 102. Detector 102 provides a first output 102b at which the in-phase I′ video components are present; this I′ signal is the standard NTSC video signal. A quadrature-detected signal Q′ is provided at another output 102c and is the detected difference-luminance signal Y(A−B). It should be understood that it is preferable, although not absolutely necessary, that an HRTV receiver will use a separate sound I.F. amplifier, rather than an intercarrier sound arrangement where the intercarrier sound components are removed from the composite signal I′ after second detection. By use of a separate sound I.F. amplifier (not shown), receiving its input signal from a video I.F. amplifier output 101b prior to the synchronous quadrature detector 102, the quadrature difference-luminance Y(A−B) main carrier modulation is not transferred onto the sound carrier, as would occur in a sound intercarrier receiver. It will thus be understood that a normal-resolution receiver having an intercarrier sound system would tend to reproduce some difference-luminance signal modulation in the sound signal. As the frequency components of this undesired signal are either below about 60 Hz. or above one-half the horizontal scan frequency (about 7.8 KHz.), these components would be rejected in the sound channel of almost all TV receivers presently manufactured; therefore, present-resolution receivers will tend to reject the low frequency buzz and high frequency noise which might be present due to intermodulation of the quadrature difference-luminance modulation and the sound intercarrier modulation.

The in-phase I′ signal from output 102b of the synchronous quadrature detector is coupled to the input 104a of a chroma separator means 104. Separator means 104, itself known to the art and preferably using a comb filter and the like, separates the luminance signal Y(A+B), provided at output 104b, from the chroma carrier $f_c$ signal, and also demodulates the chroma signal to provide the in-phase color $I_C$ signal and quadrature-phase color $Q_C$ signal at respective outputs 104c and 104d. The $I_C$ and $Q_C$ signals are the inputs 105a and 105b of a chroma line storage means 105. The outputs 105c and 105d of means 105 are coupled to a color demodulator means 106, which decodes the three color (red, green and blue) difference signals and makes these color-difference signals individually available at outputs 106a–106c. One of outputs 106a–106c is coupled to an input of an associated one of a trio of signal adders 107–109. The remaining input of each of adders 107–109 receives line luminance information from the output 110a of a luminance line storage means 110.

The luminance line information is obtained from the Q′ output 102c signal of the synchronous quadrature detector and the summed-luminance 104b signal from separator means 104. The Q′=Y(A−B) difference-luminance signal is band-limited by a lowpass filter 112, having a cutoff frequency equal to the band limits of the modulation quadrature sidebands of the channel carrier, e.g. about 1.25 MHz. The summed-luminance signal may, if required, also be band-limited by a low-pass filter 114. The filtered Y(A−B) and Y(A+B) signals are now respectively added and subtracted from one another in respective adder means 116 and subtractor means 118. The adder output is proportional to only the first scan line luminance signal Y(A) and the subtractor output is proportional to only the second scan line luminance signal Y(B).

If the double-horizontal-frequency method of generating the high-vertical-resolution signal is used, the CRT beam must be horizontally scanned at twice the normal horizontal frequency and vertically scanned by the composite of the normal vertical scan sawtooth waveform $S_V$ and a normal-horizontal-frequency square waveform. The luminance or chroma information respectively is provided to the respective input of means 110 or means 105, respectively, at the normal-horizontal-frequency rate. Means 105 and 110 are similar in construction and operation to storage means 42 (FIGS. 5 and 5a) but require that the lower-frequency and higher-frequency clock periods be reversed. That is, the Y(A) and Y(B) information is initially stored in means 110, and the color $I_c$ and color $Q_c$ information is initially stored in means 105, at the lower clock rate (e.g. 4fc), and the stored Y(A) and Y(B) or $I_c$ and $Q_c$ information is read out at the higher-frequency clock rate e.g. at 8fc), to reverse the process which occurred at the transmitter. Input and output commutating switch means (e.g. analagous to switch means 45 and 54 of FIG. 5), in each of means 105 and 110, receive the twice-horizontal-frequency ($2f_H$) and horizontal-frequency ($f_H$) waveforms from the receiver's deflection circuitry. This deflection circuitry uses an oscillator means 120, which contains an oscillator 120a having the frequency thereof set by the horizontal synchronization H.SYNC. information (recovered by means not shown, but known to the art) and providing the normal-horizontal-frequency $f_H$ signal. The oscillator is followed by a frequency doubler 120b. A normal-horizontal-frequency ($f_H$) output 120c drives a waveform squarer means 121 to generate a square wave, which is applied to one input of an adder means 122, receiving the vertical scan sawtooth $S_V$ waveform at another input, to provide the composite vertical deflection signal $D_V$ at an adder output 122c. The oscillator means double-frequency signal is used for the horizontal deflection $D_H$, which will be further processed through a horizontal scan sawtooth generator (not shown). The oscillator means 120 double-frequency output waveform is also connected to the input 124a of a line detector means 124, which may be a switchable inverting/non-inverting buffer controlled by the "front porch" synchronization waveform, for providing proper line sequence information at an output 124b thereof to a control input 110b of the luminance line storage means. Means 110 also receives the first line Y(A) luminance information at an input 110c, and the second line Y(B) luminance information at an input 110d. Means 110 provides first or second line luminance information at output 110a while storage means outputs 105c and 105d provide the I and Q first or second line chroma information, which information is the same for both lines. The line information is provided through color decoder means 106 to the chroma adders 107–109. Means 124 detects when the first or second one of a pair of scan lines is about to be traced by the CRT beam to synchronize the luminance line information provided to the adders. Therefore, a pair of lines are scanned across the receiver CRT, in place of a single line in a normal-resolution receiver, and, while the color information is essentially the same for both lines, the luminance information is different, providing the double-vertical-resolution TV picture. It should be understood that an additional set of chroma adders could be utilized, with each set of chroma adders directly connected to receive one of the Y(A) and Y(B) signals, with the appropriate set of adders being blanked as required for allowing the other set of adders to provide information during the associated line of a line pair scan. Special display devices which accept the two simultaneous red, blue and green signals would be required.

Referring now to FIG. 7b, a somewhat simplified circuit 100' may be utilized when the display system, such as a three-beam color CRT and the like, utilizes the high-frequency vertical deflection time sampling method of dual line scan, as described with respect to FIGS. 2a–2d and 3, hereinabove. In circuit 100', the compatible NTSC color signal at the I' output 102 of the synchronous quadrature detector is applied to the input 130 of a color signal processor means, which extracts the three color signals R', G' and B', having amplitudes commensurate with the summed-luminance signal amplitude. These three color signals are provided at outputs 130a–130c, respectively. In a normal-resolution receiver, the signals at outputs 130a–130c would be directly connected to the three CRT grids of the picture tube. In the high-resolution receiver, each of the outputs 130a–130c is connected to one input of an associated one of three adding means 107'–109', each having the output thereof connected to one of the red, green or blue CRT grids, respectively. The second input of each of adders 107'–109' is coupled to the output means 132a of a balanced modulator means 132. The modulation input 132b of this balanced modulator means receives the band-limited difference-luminance Y(A−B) signal, after transmission through lowpass filter 112, from the quadrature Q' output 102c of the synchronous quadrature detector. The carrier input 132c of the balanced modulator means receives a sinusoidal sampling waveform (analagous to waveform 11 of FIG. 2b) of proper frequency and amplitude. The output of the balanced modulator is therefore a high frequency sine wave, at the sampling frequency, having an amplitude which varies as the amplitude of the difference-luminance Y(A−B) signal. This difference-luminance amplitude sampling frequency sinusoid is added to the R', G' and B' video signals, in adders 107'–109', and adds and subtracts the difference-luminance Y(A−B) signal in precise synchronism with the vertical deflection signal used to generate the two simultaneous scan lines. If the vertical deflection waveform $D_V$ at the output 122c of deflection adder means 122 is the combination of the vertical sawtooth scan waveform $S_V$ and the high frequency sampling waveform from a sampling oscillator means 134, then the result is the display of a pair of scan lines, the first one of which lines is of luminance Y(A) and the second one of which lines is of luminance Y(B), in reverse of the process of FIG. 2a.

It should be understood that the adders 107'–109' need not be utilized, and that the three color outputs 130a–130c may be connected directly to the CRT grids, and the difference-luminance signal connected in parallel to the cathodes of a three-gun CRT, to achieve the same summation process. Further, since the difference-luminance Y(A−B) signal is band limited to about 1.25 MHz., due to the bandwidth characteristics of the vestigial sideband used in signal transmission, a relatively low sampling and deflection frequency can be utilized. Any sampling frequency may be used which is more than twice the luminance-difference filter cutoff frequency; illustratively, a frequency of $2 \times 1.25 = 2.5$ MHz. is the lowest sampling frequency, although a higher frequency is more desirable. The use of the color subcarrier frequency $f_c$ signal, at about 3.58 MHz., is particularly advantageous, since the color burst oscillator means 134a normally found in a color television receiver is locked to a precise frequency and phase to facilitate chroma demodulation. It is also advantageous to use twice the chroma frequency as the sampling signal frequency to ensure invisibility of time sharing artifacts between the line pair; the basic chroma carrier frequency can be easily doubled at the receiver end, as by use of a frequency doubler means 134b following the color burst oscillator means 134a in the sampling oscillator means 134 in circuit 100'.

It will also be seen that, should a normal-resolution picture be broadcast from the transmitter, the Q' processing circuit, around balanced demodulator 132, can simply be turned off to allow reception of the standard NTSC signal.

The improved-vertical-resolution transmission and reception circuitry and methods described hereinabove allow twice the vertical resolution of present television standards, if increased-resolution camera and transmission facilities are used to transmit video information to a special HRTV receiver. A standard resolution television set will, nevertheless, display the high-resolution signal as a normal resolution picture, in a completely satisfactory and compatible manner. More modern standard receivers, with integrated circuits synchronous demodulators, will partially or totally reject the difference-luminance signal. Other receivers utilizing envelope detectors would show slight, but generally negligible, distortion of the luminance signal but may display a slight one-line color error on some horizontal color edges, due to quadrature phase shift of the reference carrier. However, due to the lower resolution of the standard set, such slight color errors will be generally undetectable.

Two presently preferred methods for increasing the horizontal resolution of the received picture, in a compatible manner, will now be described. Each of these methods can be used alone, or in combination with either of the pair of methods for providing increased vertical resolution, in a transmission compatible with television receivers operating to present (NTSC and the like) standards.

Figure 8A:
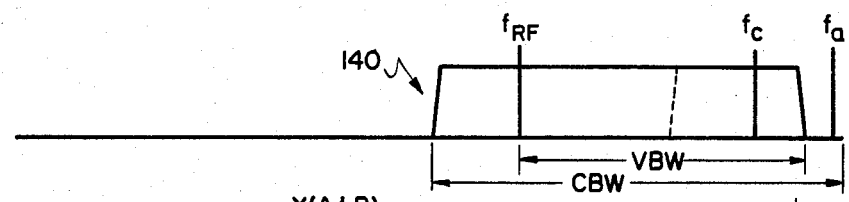
FIGS. 8a–8e are frequency spectra useful in understanding a first method for increasing horizontal resolution, with or without increased chroma resolution, in accordance with principles of the present invention.

Referring now to FIGS. 8a–8e, the first method for increasing the horizontal resolution of a television signal in compatible manner is to utilize additional transmitted signal bandwidth. The present NTSC signal 140 requires a channel CBW bandwidth of about 6 MHz. with a video VBW bandwidth for the luminance and chroma components of about 4.2 MHz. (FIG. 8a). This video bandwidth provides an upper limit on the speed at which a change can be provided in the intensity of a horizontally-scanned raster line, and thus sets the horizontal resolution of a picture transmitted by present standards.

Figure 8B:
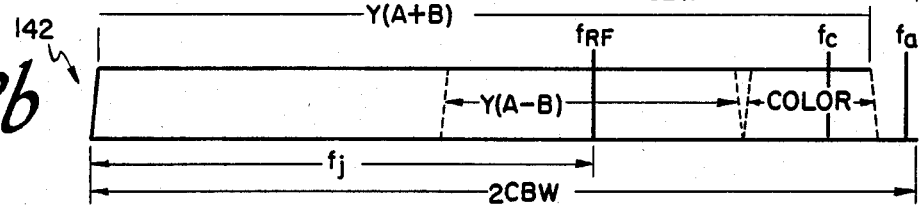

Referring to FIG. 8b, additional horizontal resolution utilizes a double-bandwidth signal 142, occupying a total bandwidth (2 CBW) twice that of the present standard transmission. In the NTSC system, this signal would occupy 12 MHz. of bandwidth, with a lower transmitted sideband bandwidth $f_l$ of about 7.25 MHz.

Figure 8C:
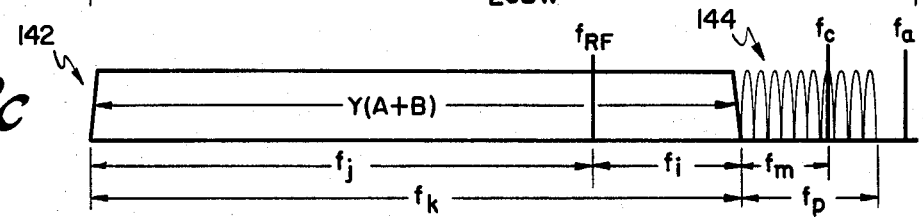
Figure 8E:
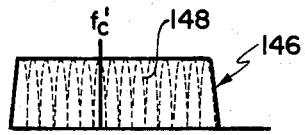
Figure 8D:
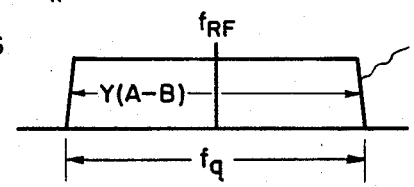

While the color bandwidth of the chroma components remains the same, as does the sound carrier $f_a$ components, the additional luminance-component bandwidth enables more rapid changes in intensity, required for increased horizontal resolution. Thus, the luminance information from the 7.25 MHz. lower sideband and from a portion $f_i$, e.g. about 2.0 MHz., of the upper sideband is recovered in the receiver, for a total vestigial sideband bandwidth $f_k$ of about 9.25 MHz. (FIG. 8c). The increased horizontal-resolution signal may be transmitted with increased vertical-resolution information, by transmitting the Y(A−B) difference-luminance signal in phase-quadrature with the summed-luminace Y(A+B) increased bandwidth components of the in-phase signal. With, or without, the increased-vertical-resolution quadrature component for the difference-luminance information, the increased-horizontal-resolution signal is compatible with present standards, as a present-day NTSC standard receiver will ignore the additional lower sideband information, while the upper sideband information is identical with the present-day (NTSC and the like) standard. However, a difference-luminance signal 143 can also now be transmitted with greater bandwidth $f_q$ (FIG. 5d) which can be on the order of 4 MHz. and help provide increased resolution. Color information (in bandwidth $f_p$) is located about the chroma carrier frequency $f_c$ and thus has a lower sideband extending to a bandwidth $f_m$ below carrier $f_c$. The standard color resolution would be achieved, with a full 1.5 MHz. of color-I signal bandwidth and a full 0.6 MHz. color-Q signal bandwidth available. Advantageously, the chroma components of the recovered video signal will be comb-filtered, as shown in frequency region 144, to eliminate transmitted luminance components falling within the chroma bandpass. These upper sideband luminance components are not needed at the high-resolution receiver, but can be transmitted, as is presently done, to provide compatability with present-day comb-filter-type receivers. Further, if additional color resolution is desired, the extended-bandwidth method allows transmission of wide-band color-I and color-Q signals on a second chroma subcarrier $f_{c'}$ (FIG. 8e) in the lower luminance sideband. This second chroma signal 146 can provide a color-I signal bandwidth on the order of 3 MHz. and a color-Q signal with a bandwidth on the order of 1.2 MHz., all contained in a spectrum (having a total bandwidth on the order of 4.2 MHz.) interleaved with the summed-luminance signal in the lower sideband. The second color subcarrier would thus be sufficiently far removed (e.g. about 6 MHz.) from the picture carrier frequency $f_{RF}$ to allow the extended bandwidth $f_q$ difference-luminance signal 143 to be utilized for increased-vertical-resolution. The luminance spectra will have to be comb-filtered (as in area 148) in the receiver, with resulting comb-filter artifacts, to remove the lower sideband additional-chroma information, but the vertical detail signal available from the comb filter will still have a fully adequate bandwidth, on the order of about 3 MHz. The increased-horizontal-and-chroma-resolution signal is still completely compatible with a standard receiver, as the standard receiver, stripping off the added bandwidth of the lower sideband, removes the additional chroma information at the same time that the additional luminance information is removed.

It will be seen that additional horizontal resolution can be obtained by utilizing additional bandwidth. Improvements in system signal-to-noise ratio are obtainable by transmitter preemphasis of higher-frequency, lower-sideband components. As the higher-frequency, lower-sideband components are usually of lower amplitude, considerable preemphasis can be utilized. Additionally, as the high-resolution receiver must use a synchronous detector, envelope detector distortion will not arise because of the use of preemphasis in the transmitted sideband.

While this method for providing increased horizontal and/or chroma resolution may not be fully utilizeable in broadcast television (wherein adjacent channels are not always vacant in a given geographic area, to provide the double-channel bandwidth necessary), almost all present UHF television stations are on channels which are well separated from other channels in the same geographic area and could be used for transmission of a double-channel high-resolution signal, utilizing the next-lowest channel to provide the additional lower sideband spectrum space needed. (The possible exception is the lowest UHF channel, channel 14 in the United States, of the spectrum.) As the additional spectrum would contain relatively-low-level sideband information and have no high-level carriers, little or no effect on the present-day receiver will be encountered. The wide bandwidth necessary for this method of increased-horizontal-resolution is less of a disadvantage in transmission of television signals by cable, wherein the cable company has full control over utilization of adjacent channel bandwidths. While the required double channel bandwidth would reduce the total number of program channels which may be carried on a cable system to the subscriber, one or more channels are normally vacant and the cable operator can elect to provide a double-bandwidth increased resolution signal for special programming, as an income-producing feature.

Referring now to FIGS. 9a–9e, another presently preferred method for providing increased-horizontal-resolution received TV pictures depends upon the fact that the eye does not perceive fine detail in motion; motion can be satisfactorily reproduced at frame rates less than about 10 to 15 Hz. Higher frame rates, such as the standard 30 Hz. frame rate in the NTSC standard, are utilized to reduce flicker. I utilize a horizontal interlace of the TV picture and require two or more times the normal (1/30 of a second) interval to transmit a full picture frame. Therefore, increased-horizontal-resolution is obtained with added frame transmission time, rather than the use of additional transmission bandwidth as utilized in the previously-described method.

The horizontal interlace principle requires that the wideband camera video signal be sampled at a frequency $f_S$ which is an odd-integer multiple of the first-subharmonic of the horizontal scan frequency, e.g. $f_S = (f_H/2)(2k+1)$, where k is an integer. This sample frequency relationship causes samples along any video scan line to be positioned midway between other sample positions on the scan lines immediately above and below that line then being scanned. Because a frame has an odd number scan of lines (e.g. 525 scan lines in the NTSC standard), the samples on that same scan line, but during the next frame, are shifted by one-half the standard pixel distance, and lie between the samples taken during the previous frame. When the samples of the two consecutive frames are combined in a receiver, the effective sampling rate and the effective detail resolution are both doubled.

Figure 9A:
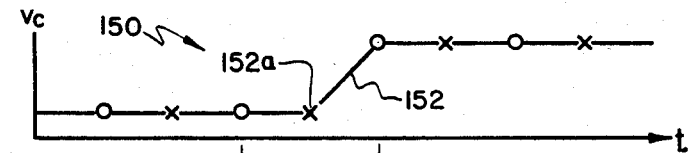
FIGS. 9a–9e are coordinated waveforms illustrating a horizontal interlace method for providing high horizontal resolution TV signals, in accordance with the principles of the present invention.
Figure 9B:
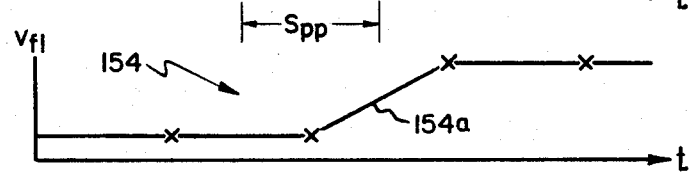
Figure 9C:
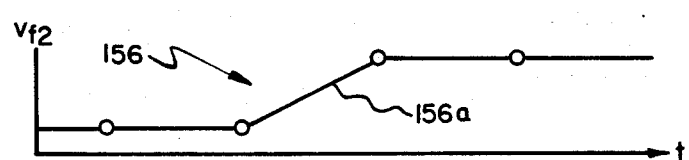
Figure 9D:
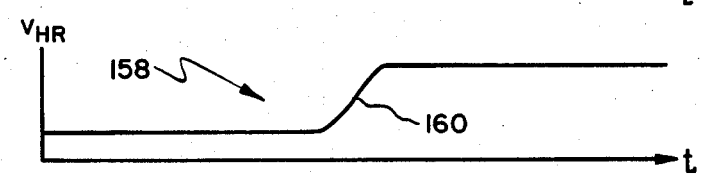
Figure 9E:
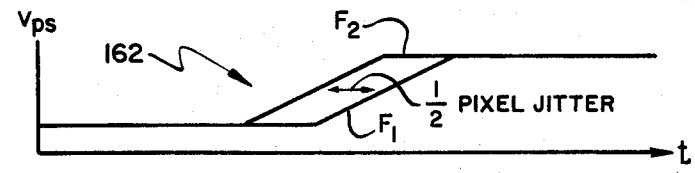

Illustratively, for a 2:1 improvement in horizontal resolution, the camera must produce a camera video $V_C$ waveform having a luminance signal bandwidth (e.g. about 8 MHz.) of about twice the bandwidth for a standard signal. The wider bandwidth video luminance signal is thus capable of producing a sharper edge 150 than the standard luminance signal; in the illustrative example, edge 150 occurs in roughly one-half of a standard NTSC pixel duration and, therefore, occupies one-half the pixel spacing interval $S_{pp}$, over the illustrated small portion of camera video waveform along one of the multiplicity of horizontal scan lines. This camera video signal is sampled at a sampling frequency which is at least twice the "odd-multiple" frequency, e.g. at about 16 MHz. Every other sample is selected to form a first-frame video waveform for transmission, whereby the properly filtered result is a video signal, transmitted during a given frame, having the normal standard video maximum bandwidth, e.g. about 4 MHz. During a next frame, which occurs about 1/30th of a second later for NTSC standard transmission, the gross detail information is essentially the same as for the picture of the first frame; the sampling waveform, because of the odd-number relationships, now selects those pixels not selected during the first frame for transmission during the second frame. A subsequent third frame sampling again selects the sites sampled during the first frame, while the sites sampled during a subsequent fourth frame repeat those of the second frame, and so forth. Thus, the video waveform 150 of FIG. 9a is sampled, during the first frame, at those one-pixel-apart points indicated by xs, and is sampled during the second frame at those pixel points indicated by open circles. The first frame video $V_{f1}$ waveform 154 of FIG. 9b thus contains an edge 154a which is a full pixel separation interval and distance $S_{pp}$ wide, starting at the same point 152a as the edge 152 in the camera waveform, but terminating one-half pixel time thereafter. Similarly, the second video frame $V_{f2}$ waveform 156 of FIG. 9c also contains an edge waveform 156a, having its midpoint at the edge-commencement point 152a of the camera video waveform, and extending one-half pixel time interval to each side thereof. The high resolution video $V_{HR}$ waveform 158 recovered at the high resolution receiver has the half-pixel-duration edge 160 (FIG. 9d) while a present-standard set recovers a video $V_{ps}$ waveform 162 which has a first edge portion $F_1$ during the first frame and a second, slightly earlier, edge portion $F_2$ during the second frame, with each edge portion requiring a full pixel duration for the change, as compared to a half-pixel-duration for edge 160. There is therefore a one-half pixel jitter in the edge recovered on a present standard receiver, which jitter provides a certain degree of flicker, which may or may not be discernable on a present standard set, dependent upon the particular scene being visibly displayed. Thus, with my horizontal interlace system, the complete fine-detail picture is transmitted in a pair of sequential frames, i.e. is transmitted every 1/15th of a second. A signal with detail resolution equal to the present-day NTSC standard is transmitted every 1/30th of a second, i.e. with compatible frame rate. Large area information is transmitted every 1/30th of a second, but finest detail information at display edges is only transmitted at the lower 1/15th of a second rate. Therefore, only the finest details of motion are updated at 15 Hz. and details at NTSC resolution are updated at 30 Hz.; the only difference between succeeding video frames is thus in the difference of finest detail at sharp edges, which results in a tiny difference of one-half the NTSC pixel at the edges of a high performance 4 MHz.-bandwidth NTSC receiver.

The 15 Hz. flicker at sharp edges which may result in a high-resolution receiver may be removed if a frame storage system is utilized, although the frame storage system is only needed to remove this fine edge flicker. Advantageously, the addition of a frame storage system will provide additional benefits, such as elimination of certain NTSC color artifacts and the like, while providing the steady, flicker-free and easy-to-view display picture. If a frame storage system is utilized, the horizontal interlace method can be extended to obtain a 3:1 or better resolution improvement. This is often desirable, as a 3:1 improvement can result in fewer artifacts, due to the frequency interleaving of luminesence and chroma signals in the NTSC system, since it would retain interleaving down to the 10 Hz. level. A 2:1 resolution improvement causes 15 Hz. sidebands of the luminesence and color to fall on top of one another, even while the main 7.5 KHz. sideband separation is retained; chroma filtering at the transmitter, prior to luminance-chroma combination, may be utilized to remove any residual artifacts.

The horizontal interlace method requires that the sampling frequency be sufficiently high, typically on the order of 8 MHz. and that the sampling waveform at the receiver be synchronized with the sampling waveform at the transmitter, which synchronization can be accomplished during the vertical interval by any of several known methods. The sampling frequency for the 2:1 resolution improvement system can be derived as an odd multiple of one-half the horizontal scan frequency, with relationship similar to the relationships utilized for setting the frequency of the chroma subcarrier in present color transmissions.

Figure 10A:
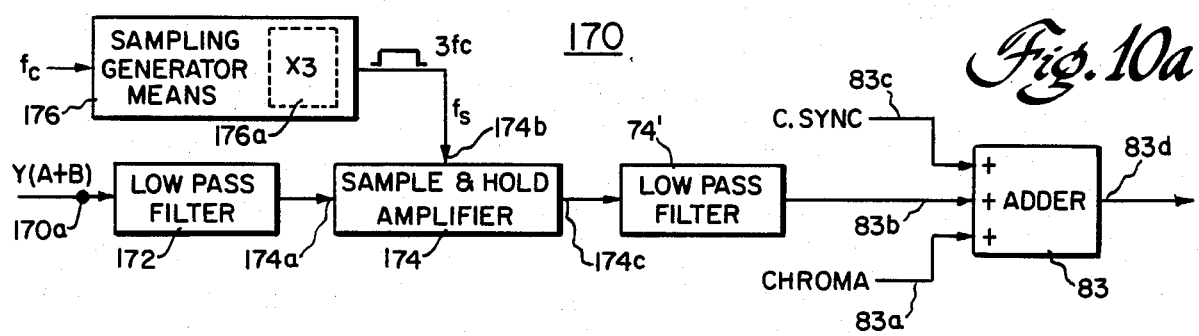
FIG. 10a is one presently preferred embodiment of circuitry for use at a transmitter to facilitate transmission of a high horizontal resolution signal using the method of FIGS. 9a–9e.

Referring now to FIG. 10a, one presently preferred embodiment of apparatus 170, for use at the transmitting station for providing a horizontal interlace signal, receives the camera summed-luminance $Y(A+B)$ signal at an input 170a thereof. The summed-luminance signal is transmitted through a lowpass filter 172, having a cutoff frequency which determines the ultimate system resolution; in the example, the filter cutoff frequency is set at about 6.5 MHz., to avoid sampling-aliasing problems. The resulting band-limited video signal is coupled to the signal input 174a of a sample-and-hold amplifier means 174. A sampling pulse signal, at a sampling frequency $f_S$, is applied to a sample input 174b, from the output of a sampling generator means 176. Because the sampling frequency $f_S$ must be an odd multiple of one-half the horizontal scan frequency $f_H$, about 15.734 KHz., in the NTSC color standard, and the chroma frequency $f_C$ (e.g. about 3.57945 MHz.) is already an odd harmonic (e.g. the 455th harmonic) of first-subharmonic frequency $f_H/2$, it is convenient to use a sampling frequency $f_S$ equal to the third harmonic of the chroma carrier frequency $f_c$, as may be provided by using a frequency tripler 176a in the sampling generator means. The approximately 10.74 MHz. sampling frequency can thus be locked to the chroma carrier at both the transmitter and receiver. The sampled-and-held video signal at the amplifier output 174c is then band limited by a subsequent lowpass filter 74', e.g. having a 4.2 MHz. cutoff frequency, before being applied to the luminance input of the adder 83 (see FIG. 6) in the transmitter. It should be understood that if a high-horizontal-resolution picture using horizontal interlace is to be provided with high-vertical-resolution, then filter 172, sampleand-hold amplifier 174 and sampling generator means 176 are utilized with the transmitter of FIG. 6, with lowpass filter 172 and amplifier 174 being sequentially positioned between adder means 66 and lowpass filter 74'.

Figure 10B:
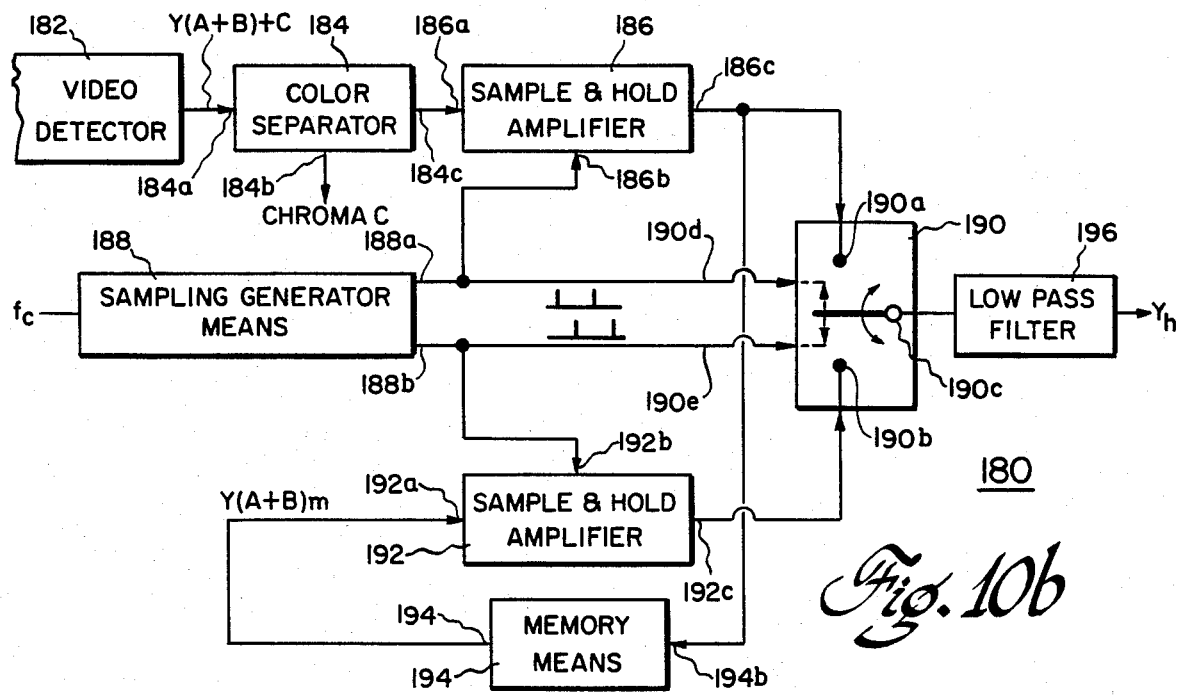
FIGS. 10b and 10c are presently preferred embodiments of receiver circuitry for use in a high resolution TV receiver in a horizontal interlace system.
Figure 10C:
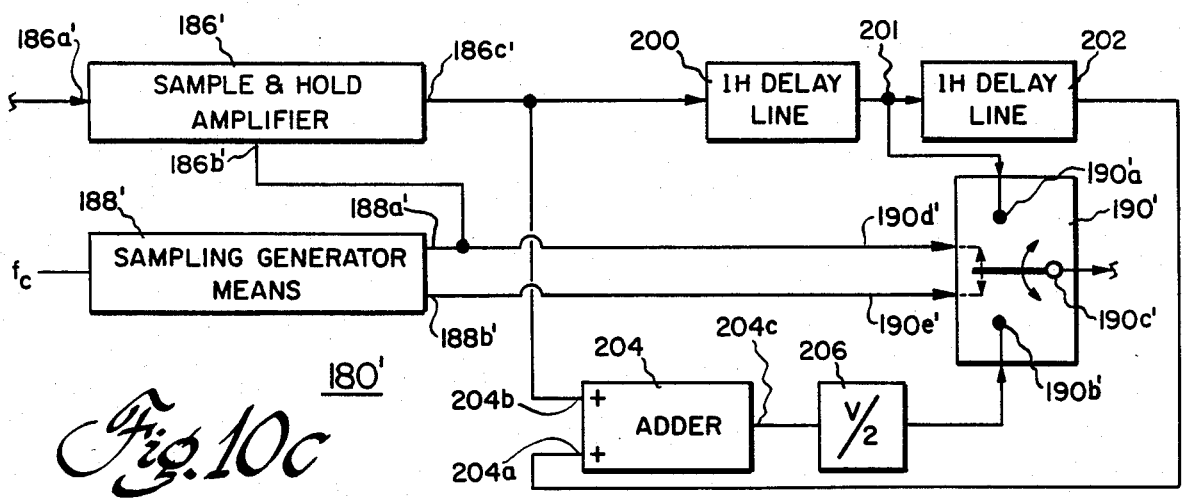

Referring now to FIGS. 10b and 10c, the horizontal-interlace method of providing increased horizontal resolution is of advantage in processing the signal at the receiver. As a total frame has an odd number of scan lines, the use of a scanning frequency, e.g. the 10.74 MHz. sampling frequency, having an odd multiple of one-half the horizontal scanning frequency also provides for samples of the same line of a next frame being spaced midway between the samples of a presently-sampled line. Therefore, if the samples of the two identical lines of adjacent frames are combined in the receiver, the effective sampling rate is doubled and the effective horizontal resolution increased to that permitted by a broader transmitter filter, e.g. the 6.5 MHz. filter, which was therefore used as lowpass filter 172 in the transmitter circuit 170.

In the receiver subcircuit 180 of FIG. 10b, the summed-luminance Y(A+B) and chroma C output of a video detector means 182 is coupled to the input 184a of a color separator means 184, which may be a notch filter, a comb filter and the like. The chroma C signal is provided at a separator means output 184b different from that output 184c at which is provided the summed-luminance signal. The luminance output signal from separator means output 184c is provided to the signal input 186a of a sample-and-hold amplifier means 186. A sample strobe signal provided to the amplifier sample input 186b must be exactly in phase with the sampled strobe provided to the transmitter sample-and-hold amplifier input 174b (FIG. 10a). Thus, by using the third harmonic of the chroma carrier frequency $f_c$ signal, which is provided in phase-locked relationship in the receiver, this phase relationship is provided at the receiver. The sampled-and-held signal at amplifier output 186c is provided to a first selectable terminal 190a of a switching means 190. The sequential sample-strobe pulse signal applied to input 186b is provided at a first output 188a of a sampling generator means 188, having a second output 188b at which a string of sequential sampling-strobe pulses are provided with the same frequency, e.g. $3f_c$, as, but with 180° phase shift from, the output pulses at first output 188a. Output 188b is connected to the sample strobe input 192b of another sample-and-hold amplifier means 192. Means 192 has a signal input 192a receiving a summed-luminance Y(A+B)m signal from the output 194a of a memory means 194, having its input 194b connected to the output 186c of first sample-and-hold amplifier means 186. Memory means 194 supplies the video data necessary to reconstruct a wide-bandwidth, high-horizontal-resolution image from the data contained in adjacent frames of a horizontally-interlaced signal. The second sample-and-hold amplifier means output 192c is connected to another selectable contact 190b of the switching means. The switching means common output terminal 190c is selectably connected to terminals 190a or 190b responsive to the presence of a strobe pulse at a respective one of control inputs 190d or 190e, respectively. The video information at switch output terminal 190c is, after being band limited by a subsequent lowpass filter means 196, a reconstruction of the high-horizontal definition video waveform. Therefore, filter 196 must have minimum cutoff frequency of about 6.5 MHz. and a maximum cutoff frequency of about 8.4 MHz. The band-limited video information at the output of filter 196 provides the high resolution luminance signal $Y_h$. This signal will provide substantially twice the horizontal resolution of a typical present-day receiver, presently having about 3 MHz. horizontal response.

Memory means 194 would ideally be a complete frame store memory, capable of recalling, upon demand, the proper samples for the same scan line in a previous frame. The samples would ideally be spaced midway between the present line samples and would therefore completely fill the missing samples in the video data, as explained hereinabove with respect to FIGS. 9a–9e. Because a frame store memory is presently a relatively expensive and voluminous digital apparatus, a somewhat less complex TV receiver subcircuit 180' (FIG. 10c) could be for obtaining an estimate of the missing alternate samples.

Subcircuit 180' utilizes samples of the scan line immediately above and the scan line immediately below the scan line being received, to provide an estimate of the missing samples on the scan line then being received. Since the immediately-preceeding line and immediately-subsequent line are sampled midway between the samples in the scan line of interest, these lines may be recalled by use of a pair of horizontal-line storing means 200 and 202. Illustratively, each of means 200 and 202 comprises a delay line having a one-horizontal-line delay time, equal to the reciprocal of the horizontal scanned $f_H$ frequency, or a delay time of about 63.5 microseconds. After video detection in means 182 and chroma separation in means 184, the summed-luminance signal is sampled-and-held in means 186', responsive to the sample-strobe signals from means 188'. Second sample-and-hold means 192 is not required. The sampled-and-held video signal at output 186c' is sequentially transmitted through first delay line 200 and thence through second delay line 202. The sample for the presently-scanned line is taken from the junction 201 between delay lines 200 and 202. Thus, at the time that the presently-scanned line sample appears at switch means terminal 190a', the immediate-previous-line sample is, due to the one line delay in means 202, provided at the output of delay line 202 and at a first input 204a of an analog adder means 204. Simultaneously therewith, the next-subsequent-line sample is just being output from sample-and-hold amplifier means 186' to the input of first delay line 200, and to a second input 204b of the analog adder. The last-previous-line and next-subsequent-line samples are added in analog adder means 204 and the sum of these two video signals appears at adder output 204c. The additive result is attenuated by a factor of two, in means 206, and this averaged result is coupled to switching means selectable terminal 190b'. The common switch means terminal 190c' thus receives the delayed present-line sample when the sampling generator output 188a' is pulsed, and receives the two-adjacent-scan-lines average signal from terminal 190b', when the out-of-phase generator output 188b' is pulsed, in between present-line samples. This effectively doubles the horizontal fine-detail resolution.

It should be understood that each of the delay lines 200 and 202 may be realized by CCD analog shift registers, which may each have a multiplicity (e.g. 682.5) of stages and which may be clocked at the sampling $f_S$ frequency, e.g. at about 10.74 MHz. Sampling frequencies other than 10.74 MHz. can be utilized, as can other circuits for estimation of the missing samples. Similarly, this interlace method can also be utilized for increasing chroma resolution, whereby a fully-compatible signal having higher vertical and horizontal luminance resolution and higher chroma resolution, may be obtained.

Figure 11:
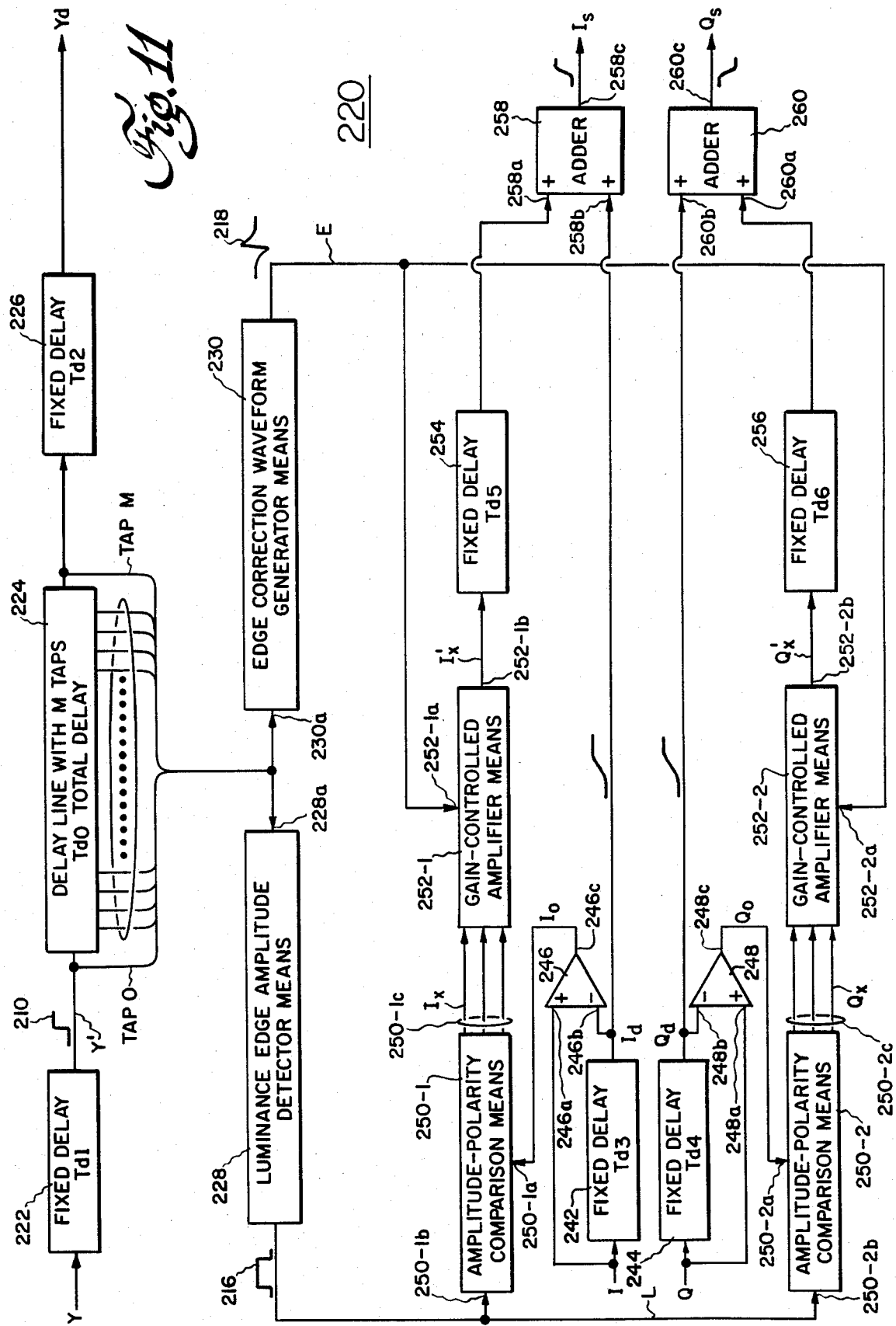
FIG. 11 is a block diagram of a presently preferred circuit for providing increased chroma definition by correction of chroma edge waveshape, in accordance with principles of the present invention.
Figure 11A:
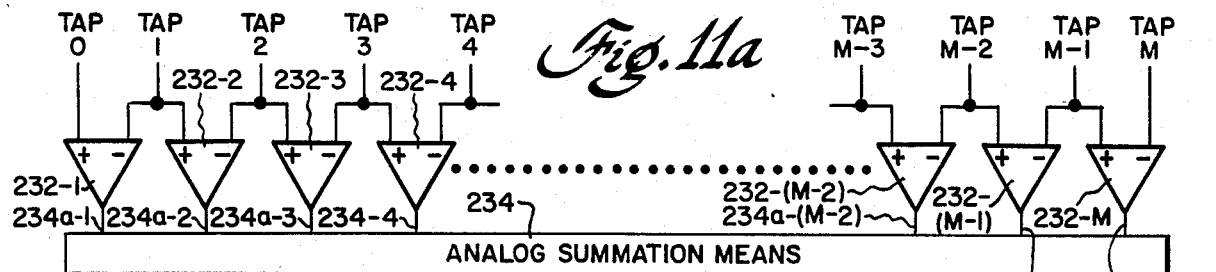
FIGS. 11a–11c are schematic block diagrams of one presently preferred embodiment of edge amplitude detector means, edge correction generator means and amplitude-polarity comparison/gain-controlled amplifier means, respectively, for use in the circuit of FIG. 11.
Figure 11B:
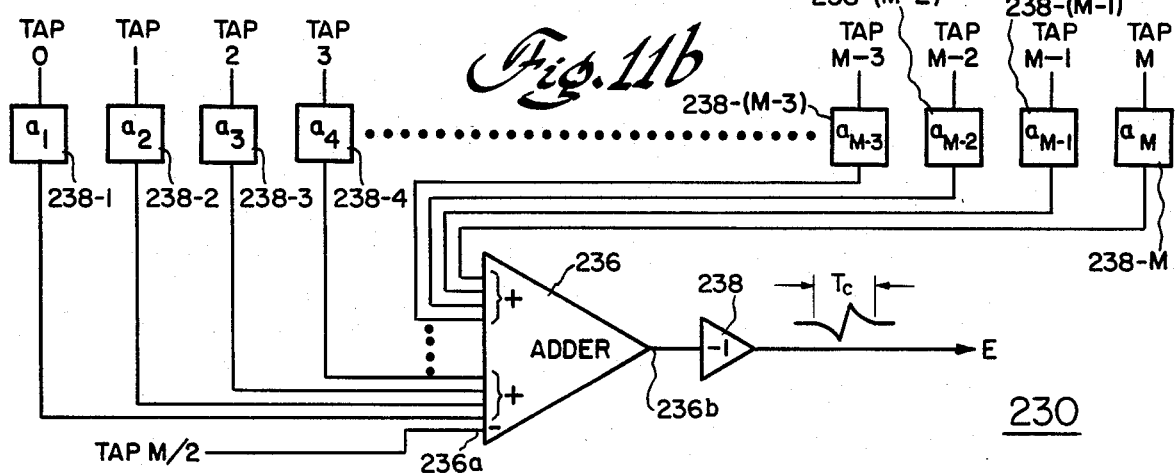

Referring now to FIGS. 11, 11a–11c and 12a–12k, another method for providing increased chroma resolution, by correction of chroma edge waveshapes, will also be described with respect to one presently preferred embodiment of apparatus for carrying out this method. The improvement in horizontal color resolution is provided by detecting the transmitted luminance edge information and generating from the luminance signal two correction waveforms which, when added to the original I and Q color signals, results in sharper color edges. By detecting when an edge occurs in both the color and luminance channels, a correction waveform is generated from the luminance signal and then corrected in amplitude and polarity for each of the color signals, in accordance with transition characteristics of the two color signals. The edge amplitude is established by the color channel signals and the edge sharpness is established by luminance channel signals. Thus, the luminance I waveform 210 (FIG. 12a) has transitions 210a or 210b, occurring in a time interval $t_L$ which are more narrow than the longer transition time intervals $T_c$ of transitions 212a and 212b or 214a and 214b of the color-I waveform 212 (FIG. 12b) or the color-Q waveform 214 (FIG. 12c). The luminance edge amplitude is detected to provide an amplitude correction L waveform 216 (FIG. 12d), while the luminance transitions themselves are detected to provide an edge correction E waveform 218 (FIG. 12g); the L and E correction waveforms are utilized to generate signals of proper amplitude and polarity for correcting each of the color-I and color-Q signals to provide a sharpened-edge pair of color-$I_S$ and color-$Q_S$ waveforms (FIGS. 12j and 12k, respectively) for use in a subsequent color decoder means (see e.g. decoder 106 of FIG. 7a and the like).

The improved-horizontal-color resolution circuit 220 (FIG. 11) receives the demodulated luminance Y information for transmission sequentially through a first fixed time delay $T_{d1}$ means 222, a tapped delay means 224 (having a plurality M of taps with substantially equal delay times therebetween and a total delay time $T_{d0}$) and a second fixed time delay $T_{d2}$ means 226, to provide a delayed luminance Yd signal. The M taps of delay line 224, in addition to the zero-th "tap" from the input thereof, provide M+1 signals to the parallelled inputs 228a and 230a of the weighted summation networks forming a luminance edge amplitude detector means 228 and an edge correction waveform generator means 230.

The luminance edge amplitude detector means 228 (FIG. 11a) utilizes a plurality M of differential amplifier means 232 and an M-input analog summation means 234. Each of the differential amplifier means 232 has a non-inverting input receiving the signal from an associated one of the tap 0 through tap (M−1) outputs of delay line means 224, and has an inverting input receiving the output from the next-higher-numbered one of tap 1 through tap M of the delay line means 224. The output of each differential amplifier 232 is connected to a different input 234a-1 through 234a-M of the analog summation means, which has an output 234b. Thus, the first differential amplifier 232-1 has its non-inverting input receiving the tap 0 signal and its inverting input receiving the tap 1 signal. The second differential amplifier 232-2 receives the tap 1 signal at its non-inverting input and the tap 2 signal at its inverting input. Similarly, the third and fourth differential amplifiers 232-3 and 232-4, respectively, receive the tap 2 and tap 3 signals at the respective non-inverting inputs and the tap 3 and tap 4 signals at the respective inverting inputs. The (M-2)-th and (M-1)-th operational amplifiers respectively receive the tap (M-3) signal and the tap (M-2) signal at the respective non-inverting inputs thereof and respectively receive the tap (M-2) and tap (M-1) signals at the respective inverting inputs thereof. The last operational amplifier 232-M receives the tap (M-1) signal at the non-inverting input and the tap M (i.e. the delay line output) signal at the inverting input thereof. The contribution of each differential amplifier output to the luminance edge amplitude pulse L signal at output 234b is of an amplitude and polarity determined by the amplitude and polarity of the luminance edge then being processed, and of a time duration ($T_C/M$-$Td0/M$) determined by the delay characteristics of delay line means 224. Thus, for a rising luminance edge 210a having a greater amplitude than the amplitude of a falling luminance edge 210b, the luminance edge amplitude L signal (FIG. 12d) has a non-zero portion 216a which is of greater amplitude than the amplitude of a negative-polarity portion 216b, with the polarity of the amplitude L signal being determined by the rise (at portion 210a) or fall (at portion 210b) of the luminance signal edge.

Figure 12A:
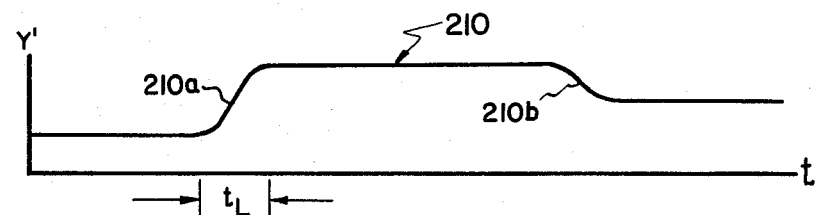
FIGS. 12a–12k are a set of coordinated waveforms illustrating operation of the circuit of FIGS. 11a–11c.
Figure 12B:
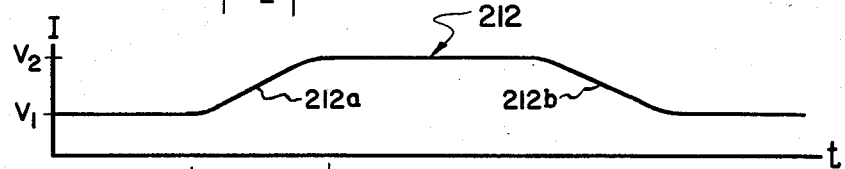
Figure 12C:
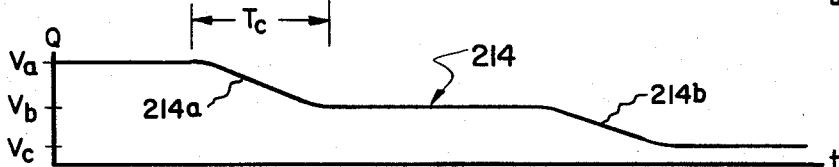
Figure 12D:
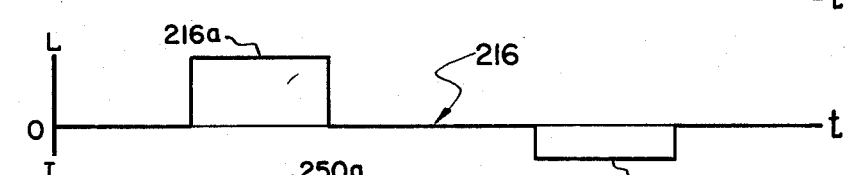
Figure 12E:
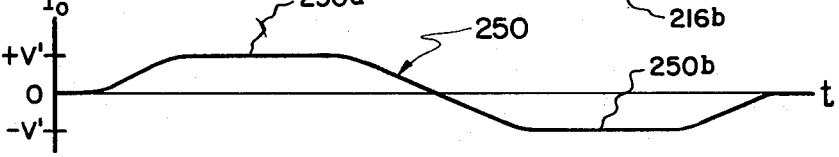
Figure 12F:
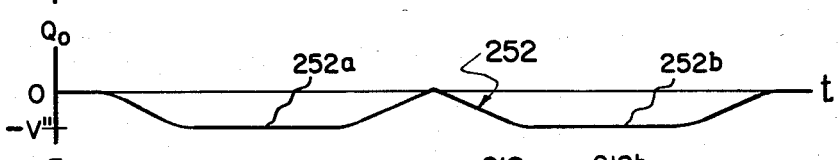
Figure 12G:
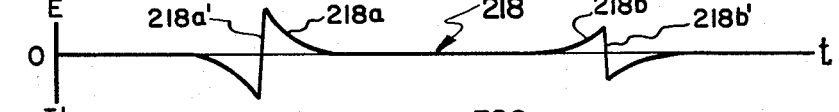
Figure 12H:
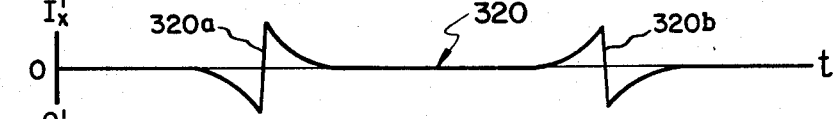
Figure 12I:
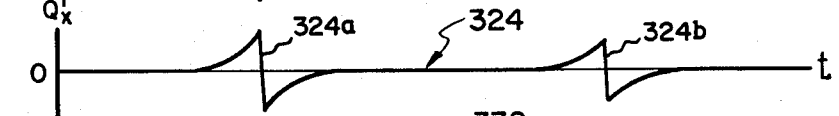

The edge amplitude waveform generator means 230 (FIG. 11b) utilizes an adder means 236 having a plurality M of non-inverting (+) inputs and a single inverting (−) input. Advantageously, the number M of delay line taps (including the M-th output tap) is an even number, such that the total number M+1 of delay line signals (including the input "tap 0" signal) is an odd number of signals. The middle-most tap signal, e.g. from tap M/2, is connected to the adder inverting input 236a. Each of the other taps, from tap 0 through tap ((M/2)−1) and from tap ((M/2)+1) through tap M, is transmitted through an associated one of a plurality M of attenuator means 238 to an associated non-inverting adder input. Each of attenuation means 238 has an individual attenuation $a_m$ selected to generate a waveform having an abrupt polarity transition at a time when the luminance Y edge reaches the mid-tap M/2 connected to the inverting input and with a transition polarity responsive to the polarity of the luminance edge. The adder means output 236b is coupled through an analog inverter 238 to provide the proper-polarity edge correction E waveform 218 (FIG. 12g). It should be understood that a single non-inverting input differential amplifier may be utilized for adder means 236, by connection of a single resistance from the non-inverting input to circuit common; each of the M attenuator means 238 would then be a single series resistance between the associated tap and the single adder non-inverting input, of value selected to provide the desired voltage-division (attenuation) ratio in conjunction with the resistance of the single fixed resistance connected from the non-inverting input to circuit common. This weighted-summation network thus provides a first edge correction waveform portion 218a having a positive-going sharp transition 218a', responsive to the positive-going rising edge 210a in the luminance Y waveform and provides an edge correction waveform portion 218b having an abrupt negative-going transition 218b', responsive to the negative-going falling luminance edge 210b. The peak-to-peak amplitude of portion 218a is greater than the peak-to-peak amplitude of portion 218b, in proportion to the change in amplitude of the luminance Y portions 210a and 210b. The duration of the correction waveform portions 218a and 218b are identical, of duration $T_C$, centered about the center of the luminance waveform change portions 210a and 210b, and of substantially the same duration as the change portions 212a or 212b and 214a or 214b in the lower-resolution color-I and color-Q waveforms.

The color-I and color-Q signals are each individually transmitted through an associated one of third and fourth fixed delay means 242 and 244, having respective time delays $T_{d3}$ and $T_{d4}$. The color-I signal is also directly connected to the non-inverting input 246a of a differential amplifier means 246, having its inverting input 246b connected to the output of the I fixed delay line 242. The color-Q signal is directly connected to the non-inverting input 248a of another differential amplifier means 248, having its inverting input 248b connected to the output of the Q fixed delay line 244. The delayed color-I signal $I_d$ waveform is subtracted from the color-I waveform in means 246 to provide an intermediate $I_0$ waveform 250 (FIG. 12e) at output 246c. The amplitude and polarity of the $I_0$ waveform 250 varies as the amplitude and polarity of the edge portions of the color-I waveform 212. Thus, responsive to a rising color-I waveform portion 212a, changing from lesser level $V_1$ to greater level $V_2$, the $I_0$ waveform portion 250a has a positive polarity and a magnitude $V'$; similarly, responsive to the decreasing color-I waveform portion 212b, falling from level $V_2$ to level $V_1$, the $I_0$ waveform portion 250b has a negative polarity and a magnitude $V'$. The $Q_0$ intermediate waveform 252 (FIG. 12f), formed at the output 240c by subtraction of the delayed $Q_d$ waveform from the color-Q waveform, has the same durational characteristics as the intermediate $I_0$ waveform (if $Td_3 = Td_4$, as in the preferred embodiment), but has amplitude and polarity determined by the transitions in the color-Q waveform 214 (FIG. 12c). Thus, when the color-Q waveform at level $V_a$ transitions, in region 214a, to lesser level $V_b$, this negative-going transition provides a negative-polarity $Q_0$ waveform portion 252a, of magnitude $V''$. Similarly, when the color-Q waveform transitions from level $V_b$ in transition portion 214b, to lesser level $V_c$, the corresponding $Q_0$ waveform portion 252b is again of negative polarity and of an amplitude, e.g. $V'''$ if the differences between levels $V_a$ and $V_b$ and between levels $V_b$ and $V_c$ are identical, commensurate with the transition amplitude. It will be seen that the third and fourth fixed delay means 242 and 244 must each have time delays $T_{d3}$ and $T_{d4}$ which are greater than the first fixed time delay $T_{d1}$ initially encountered by the luminance Y signal and delay means 222. The longer delay times of the I and Q delay lines 242 and 244, with respect to the delay time of delay means 222, is established such that the total time required for the transitions of the intermediate $I_0$ and $Q_0$ signals to occur is still less than the total time required (due to delay time Td1 and the time required to form the edge amplitude signal L signal via delay means 224 and the weighted-summation network of means 228 or 230) for the transitions in the luminance edge amplitude L or edge correction waveform E waveforms to occur. Thus, the steady-state values of the $I_0$ and $Q_0$ waveforms are attained and held for the duration of the luminance edge amplitude L and edge correction E waveforms, so that the amplitude and polarity of the color-I and color-Q waveforms can be properly determined.

The color-I and color-Q intermediate waveforms are respectively coupled to a first input 250-1a or 250-2a of an associated one of a pair of amplitude-polarity comparison means 250-1 or 250-2. A second input 250-1b and 250-2b of both of the amplitude-polarity comparison means receives the luminance edge amplitude L waveform from detector means 228. The amplitude-polarity comparison means adjusts the amplitude and polarity of the luminance amplitude signal to match that of the associated chroma amplitude signal and then provides one of luminance correction gain control $I_X$ or $Q_X$ signals, as well as a pair of polarity signals, at respective outputs 250-1c or 250-2c, to an associated gain-controlled amplifier means 252-1 or 252-2. Each gain-controlled amplifier means has an input 252-1a or 252-2a receiving the edge correction E waveform from generator means 230. The $I_x$ or $Q_x$ control signals modify the edge correction E waveform to the proper amplitude and polarity required to sharpen the edges of the associated color-I or color-Q waveform. The I-correction waveform $I_{x'}$ at output 252-1b and the Q-correction $Q_{x'}$ waveform at output 252-2b are respectively transmitted through an associated one of fixed delay means 254 or 256, respectively having fixed time delays $T_{d5}$ or $T_{d6}$. The output of fifth fixed delay means 254 is coupled to one input 258a of a two-input adder means 258, receiving the delayed $I_d$ waveform at the remaining input 258b thereof. The output from sixth fixed delay means 256 is coupled to a first input 260a of another two-input adder means 260, receiving the delayed $Q_d$ signal at the remaining input 260b thereof. The respective color-I sharpened edge $I_S$ waveform and the color-Q sharpened edge $Q_S$ waveform respectively appear at the adder outputs 258c and 260c, for use in a color decoder to derive the red, blue and green CRT signals.

Figure 11C:
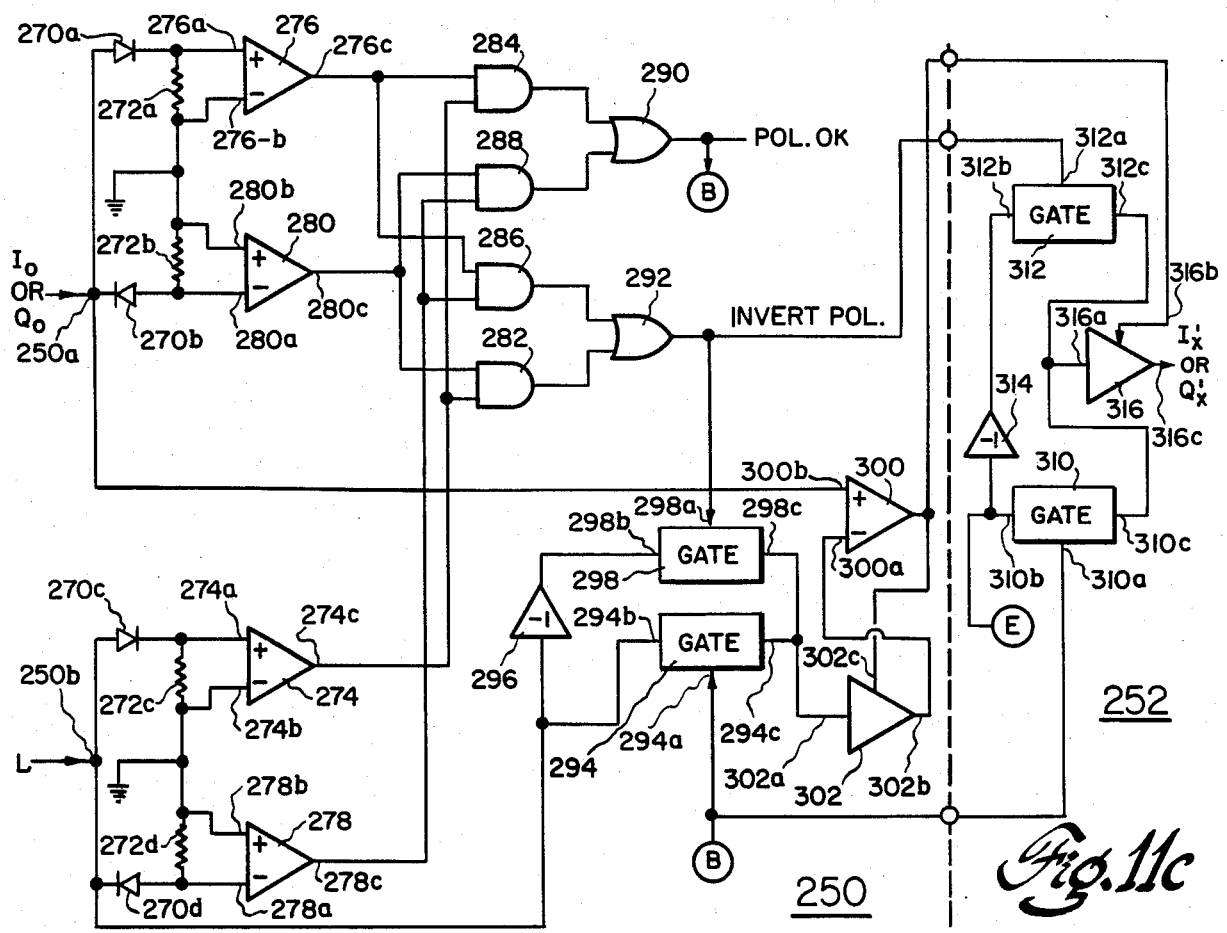

Referring now to FIG. 11c, one presently preferred embodiment of the amplitude-polarity comparison means 250 and the gain-controlled amplifier means 252, for one of the I and Q channels, is shown. The $I_o$ or $Q_o$ signal at input 250a is applied to oppositely-poled noise-threshold diodes 270a and 270b. Similarly, the L signal at input 250b is applied to oppositely-poled noise-threshold diodes 270c and 270d. Thus, when the L signal at input 250b is of sufficient amplitude and positive polarity, diode 270c conducts and the L signal (less the voltage drop across diode 270c) appears across a diode load resistance 272c and between the non-inverting input 274a and the grounded inverting input 274b of a first comparator 274. Similarly, when the $I_o$ or $Q_o$ signal at input 250a is of sufficient amplitude and positive polarity, diode 270a conducts and the $I_o$ or $Q_o$ signal (less the voltage drop across diode 270a) appears across load resistor 272a, between the non-inverting input 276a and the grounded inverting input 276b of a second comparator 276. When the L signal at input 250b is of sufficient amplitude and negative polarity, diode 270d conducts and the L signal (less the voltage drop across diode 270d) appears across load resistor 272d, between the inverting input 278a and the grounded non-inverting input 278b of a third comparator 278. Similarly, when the $I_o$ or $Q_o$ signal at input 250a is of sufficient amplitude and negative polarity, diode 270b conducts and the $I_o$ or $Q_o$ signal (less the voltage drop across diode 270b) appears across load resistor 272b, between inverting input 280a and grounded non-inverting input 280b of a fourth comparator 280. Therefore, the first and second comparator outputs 274c and 276c are at a high (logic 1) level only if the respective signals at inputs 250a and 250b are of positive polarity. The third and fourth comparator outputs 278c and 280c are at a high (logic 1) level only if the signals at inputs 250a and 250b, respectively, are of negative polarity.

First comparator output 274c is connected to one input of each of two-input AND gates 282 and 284. The second comparator output 276c is connected to the remaining input of gate 284 and to one input of a third two-input AND gate 286. The third comparator output 278c is connected to the remaining input of gate 286 and to one input of a fourth two-input AND gate 288. The fourth comparator output 280c is connected to the remaining inputs of gates 282 and 288. Thus, the output of gate 284 is at a logic 1 level only if the signals at both inputs 250a and 250b are of positive polarity, while the output of gate 288 is at a logic 1 level only if the signals of both inputs 250a and 250b are of negative polarity. The output of gate 286 is at a logic 1 level only if the input 250a signal is of positive polarity while the input 250b signal is at a negative polarity, and the output of gate 282 is at a logic 1 level only if the input 250b signal is of positive polarity and the input 250a signal is of negative polarity. The polarities are considered to be "proper" if both inputs have the same polarity signal thereat; therefore, the outputs of gates 284 and 288 are individually connected to a different input of a two-input OR gate 290, at the output of which is provided a POL. OK signal. If the signals at inputs 250a and 250b are of different polarities, the luminance edge signal L waveform polarity must be inverted; therefore the outputs of gates 282 and 284 are individually connected to a different input of a two-input OR gate 292, at the output of which is formed an INVERT POL. signal. The output of gate 290 is connected to the control input 294a of a first analog transmission gate 294, having a gate input 294b receiving the luminance edge L waveform from input 250b. The luminance edge L waveform at input 250a is polarity-inverted by an analog inverter means 296 and presented at the signal input 298b of a second analog transmission gate means 298. The output of gate 292 is connected to the control input 298a of the second analog transmission gate. The outputs 294c and 298c of both transmission gates are connected in parallel to the input 302a of a gain control amplifier 302. The output 302b of the amplifier is connected to the inverting input 300a of a differential amplifier 300. The intermediate $I_o$ or $Q_o$ waveform signal at input 250a is connected directly to the non-inverting input 300b of the differential amplifier. The gain-controlled amplifier control input 302c is connected to the differential amplifier output 300c, at which the amplitude-polarity comparison means output $I_X$ or $Q_X$ signal is provided.

The gain-controlled amplifier means 252 receives the POL. OK logic signal at the control input 310a of a third analog transmission gate means 310, and receives the INVERT POL. signal at the control input 312a of a fourth analog transmission gate means 312. The gate means signal input 310b receives the edge correction E waveform directly, while the other gate signal input 312b receives the E waveform after polarity inversion in an analog inverter 314. Both gate outputs 310c and 312c are connected in parallel to the input 316a of another gain-controlled amplifier means 316. The gain of amplifier means 316 is controlled by the associated $I_x$ or $Q_x$ signal from generator means 320, provided at a gain control input 316b. The gain-controlled amplifier output 316c has the associated $I_{X'}$ or $Q_{X'}$ correction waveform provided thereat.

Figure 12J:
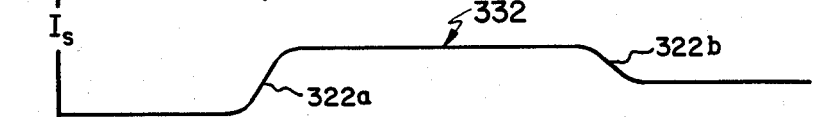
Figure 12K:
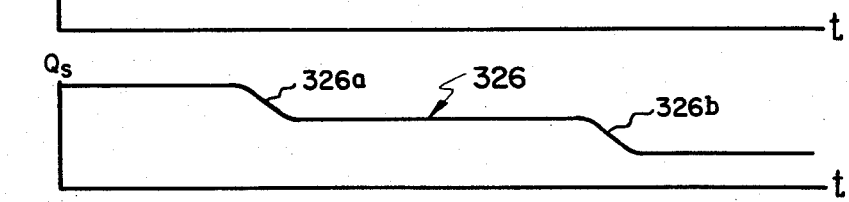

In operation, the luminance edge amplitude detector output waveform L is polarity-corrected by transmission through that one of analog gates 294 or 296 which is rendered operable by a logic 1 level at the output of the associated OR gate 290 or 292, responsive to comparison of the chroma signal polarity with the luminance edge amplitude L waveform polarity. Thus, the polarity of the L waveform at amplifier input 302a is made to be the same as the polarity of the intermediate $I_o$ or $Q_o$ waveform. The amplitude of the L waveform is modified in amplifier 302, responsive to a comparison between the amplitude-and-polarity-corrected L waveform amplitude, at input 300a of the differential amplifier, with the chroma signal amplitude, at the differential amplifier input 300b. Thus, the amplitude of the $I_x$ or $Q_x$ signal, which will be used to adjust the magnitude of the edge correction E waveform, is adjusted by the edge amplitude of the chroma signal. The polarity of the edge correction E waveform is adjusted in that one of gates 310 or 312 rendered operable to provide the proper polarity of edge sharpening waveform, with the amplitude thereof being corrected in amplifier 316 responsive to the gain-controlling waveform $I_x$ or $Q_x$, to provide the total correction waveform $I_{x'}$ or $Q_{x'}$ to the associated one of adders 258 or 260 (FIG. 11). Thus, by appropriate polarity and gain corrections, the $I_{X'}$ waveform (FIG. 12h) and $Q_{X'}$ waveform (FIG. 12i) are provided with the proper amplitudes and polarities necessary, such that when combined with the color-I and color-Q delayed waveforms in the adders, the edge-sharpened color $I_S$ and color $Q_S$ waveforms of FIGS. 12j and 12k are realized. In particular, the color-I waveform transition 212a, after passage through fixed delay means 242, requires amplitude subtraction during the initial portion thereof and amplitude addition at the latter portion thereof to sharpen the positive-going color-I edge. The $I_{X'}$ correction waveform 320 portion 320a thus has an initial negative-polarity portion and latter positive-polarity portion, which, when combined with portion 312a in adder means 258, causes the $I_S$ waveform 322 to have an sharpened edge portion 322a corresponding thereto. The $Q_{X'}$ correction waveform portion 324 has an initial positive-polarity portion and a latter negative-polarity portion to be added to the negative-going color-Q edge portion 214a to realize the sharpened-edge $Q_S$ portion 326a. The delayed color-I portion 212b and the delayed color-Q portion 214b are both, for example, negative-going transitions, requiring that the $I_{X'}$ and $Q_{X'}$ correction waveform portions 320b and 324b, respectively, have negative-going sharp transition regions with initial positive-polarity and latter negative-polarity shapes. Therefore, when signal portion 320b is added to signal portion 212b, the edge-sharpened negative-going $I_S$ signal portion 322b results, and the addition of the $Q_{X'}$ portion 324b to the properly delayed Q signal portion 214b provides the negative-going, edge-sharpened $Q_S$ portion 326b.

The method and preferred embodiment described above will sharpen a color signal edge when and only when an edge is detected in both color and luminance channels. The edge-correction waveform amplitude is set by the color channel and its sharpness is established by the luminance channel. These conditions will provide increased sharpness for most color edges, but will not operate if the width of the color area is too narrow for the color-I and/or color-Q channels to respond, in which case no color change information will be transmitted anyway. A black-and-white image edge will be reproduced exactly as in the present NTSC standards, under these conditions. It should be understood that the above method and apparatus descriptions are predicated upon the use of color-I and color-Q signals having equal bandwidths. For this equal bandwidth case, and use of NTSC standards, the first and second fixed delay means 222 and 226 may have equal time delays of about 500 nanoseconds, with a total delay of about 1 microsecond in tapped delay line means 224 (having 10 taps with a 100 nanosecond delay between adjacent taps). Similarly, the third and fourth fixed delay line means 242 and 244 may have equal time delays, of about 2 microseconds, with the fifth and sixth fixed delay means 254 and 256 having equal time delays, of about 1 microsecond. It should be understood that if the color-I and color-Q signals have unequal bandwidths, the various delays may require suitable adjustment and the third and fourth fixed delay means, and/or the fifth and sixth fixed delay means, have unequal time delays. Adjustment in the time delays of the third through sixth delay means may also be required if R-Y and B-Y signals are to be used, instead of color-I and color-Q signals, with the same results. As the increased chroma resolution method and apparatus may be utilized with a wider bandwidth transmission for increased horizontal luminance resolution or with increased vertical luminance resolution, in accordance with the methods therefor hereinabove described, a high-resolution television signal with increased vertical, horizontal and color resolution may be provided at a transmitter end and received by a consumer having a high-definition receiving apparatus as described herein.

While several presently preferred methods and apparatus for providing high-resolution television have been described herein, many combinations, variations and modifications will now become apparent to those skilled in the art. It is my intent therefore, to be limited only by the scope of the appending claims and not by the specific instrumentalities and details presented by way of description herein.

What is claimed is:

1. A method for increasing the vertical luminance resolution capacity of a transmitted television signal, comprising the steps of:
    (a) providing a television camera having a luminance video output signal of magnitude responsive to the visual luminance value at a raster spot then being scanned by a beam;
    (b) scanning the beam through a plurality of lines in a horizontal direction;
    (c) scanning the beam through each of a plurality L of different vertically-displaced lines during each of the plurality of horizontal line scans;
    (d) generating a like plurality L of substantially simultaneous luminance signals each responsive to the luminance video output signal provided by the camera when the beam is at positions defined by the associated one of the plurality L of vertically-displaced lines; and
    (e) modulating a different characteristic of at least one luminance carrier with each of the plurality L of luminance signals to transmit the increased vertical luminance resolution capacity television signal.

2. The method of claim 1, wherein a different pair of vertically-displaced lines are scanned during each of the plurality of horizontal line scans, and wherein step (c) comprises the steps of: generating a vertical scanning waveform for a standard number of horizontal line scans each substantially uniformly spaced from one another in a raster vertical direction; and superimposing another waveform upon the vertical scanning waveform to cause the beam to trace out, for each horizontal line scan, at least sequential portions of a pair of scanned lines lying adjacent to, and spaced from, one other and from all other lines scanned during each pair of interlaced frames.

3. The method of claim 2, wherein step (d) comprises the steps of: generating a first luminance signal responsive to the luminance video output signals provided by the camera only when the beam is at positions defined by a first one of the pair of scan lines; and generating a second luminance output signal responsive to the luminance video output signals provided by the camera only when the beam is at positions defined by a second one of the pair of scan lines.

4. The method of claim 3, further comprising the steps of: adding the first and second luminance signals to provide a summed-luminance signal; and subtracting the second luminance signal from the first luminance signal to provide a difference-luminance signal.

5. The method of claim 4, wherein step (e) comprises the steps of: amplitude modulating a first luminance carrier to transmit the summed-luminance signal; and simultaneously amplitude modulating a second luminance carrier in phase-quadrature with the first luminance carrier to transmit the difference-luminance signal.

6. The method of claim 5, further comprising the steps of: receiving the modulated luminance carriers at a receiver having an increased-vertical resolution display capability; recovering the first and second luminance signals; scanning the beam of a display device in the receiver to a different pair of vertically-displaced lines during each of a plurality of horizontal line scans; and alternately controlling the intensity of the beam with one of the first and second luminance signals during scanning of an associated one of each pair of vertically-displaced lines to display an increased vertical resolution television picture.

7. The method of claim 5, further comprising the steps of: providing the camera with an increased luminance video bandwidth greater than the video bandwidth necessary for transmitting a signal with normal horizontal resolution; and transmitting at least the modulated first luminance carrier with at least one of the upper and lower sidebands thereof having greater bandwidth than the bandwidth normally utilized for transmission of a normal-resolution television signal and containing the additional horizontal resolution information in the increased camerea video bandwidth.

8. The method of claim 7, wherein the lower sideband of the first carrier has a bandwidth greater than the upper sideband bandwidth.

9. The method of claim 7, further comprising the steps of: receiving the modulated luminance carriers at a receiver having an increased vertical and horizontal resolution display capability; recovering the first and second luminance signals; scanning the beam of display device in the receiver to a different pair of vertically-displaced lines during each of a plurality of horizontal line scans; alternately controlling the intensity of the beam with one of the first and second luminance signals during scanning of an associated one of each pair of vertically-displaced lines; and recovering the increased-horizontal-resolution information from the wide-bandwidth transmitted signal for displaying an increased horizontal and vertical resolution television picture.

10. The method of claim 7, wherein a color television signal is transmitted, further comprising the steps of: providing a chroma subcarrier in each of the upper and lower sidebands of the transmitted signal; and modulating each of the chroma subcarriers with different chroma information to provide a transmitted signal with increased chroma resolution capacity.

11. The method of claim 10, further comprising the steps of: receiving the modulated luminance carriers at a receiver having an increased vertical, horizontal and chroma resolution display capability; recovering the first and second luminance signals; scanning the beam of display device in the receiver to a different pair of vertically-displaced lines during each of a plurality of horizontal line scans; and alternately controlling the intensity of the beam with one of the first and second luminance signals during scanning of an associated one of each pair of vertically-displaced lines to display an increased vertical resolution television picture; recovering the increased-horizontal-resolution information from the wide-bandwidth transmitted signal; and recovering the chroma information modulated onto each of the chroma subcarriers for providing increased vertical, horizontal and chroma resolution in the displayed television picture for displaying an increase-horizontal resolution-television picture.

12. The method of claim 9, further comprising the steps of: extracting information characterizing the sharpness of luminance edges from the received luminance information; and modifying the received chroma information responsive to the extracted luminance edge information to provide a display color television picture having an increased color resolution relative to the color resolution of a picture displayed with unmodified color information.

13. The method of claim 6, further comprising the steps of: extracting information characterizing the sharpness of luminance edges from the received luminance information; and modifying the received chroma information responsive to the extracted luminance edge information to provide a displayed color television picture having an increased color resolution relative to the color resolution of a picture displayed with unmodified color information.

14. The method of claim 5, further comprising the steps of: scanning the camera beam through a normal number of horizontal scan lines for a normal-resolution picture; sampling each horizontal line at a sampling frequency causing an integer number I of substantially equally-spaced successive samples to occur for each pixel defined in a normal-resolution horizontal line; selecting, for each successive one of a plurality number I of frames, similarly placed samples in each successive group of samples each having the integer number I of samples therein; forming each successive one of the integer number I of successive video frame waveforms from the successively selected sampled groups; and transmitting the successive video frame waveforms to provide a television picture having the integer number I of frames interlaced to provide a picture also having increased horizontal resolution when displayed.

15. The method of claim 14, wherein the integer multiple number I is equal to 2, and including the step of forming the video waveform, for each of a pair of alternating frames, of alternating ones of the totality of samples.

16. The method of claim 15, wherein the sampling frequency is an odd-integer multiple of one-half the frequency at which the horizontal lines are scanned.

17. The method of claim 16, further comprising the steps of: receiving the modulated luminance carriers at a receiver having an increased vertical and horizontal resolution display capability; scanning the beam of display device in the receiver to a different pair of vertically-displaced lines during each of a plurality of horizontal line scans; recovering the first and second luminance signals; alternately controlling the intensity of the beam with one of the first and second luminance signals during scanning of an associated one of each pair of vertically-displaced lines; recovering the transmitted successive video frame waveforms at the receiver; sampling the recovered waveforms to obtain first frame samples; storing the first frame samples; recovering the stored first frame samples during a second frame time interval; sampling the stored samples to recover second frame samples; and alternately using the first and second frame samples to provide increased-horizontal-resolution luminance information for display of an increased vertical and horizontal resolution television picture at the receiver.

18. The method of claim 16, further comprising the steps of: receiving the modulated luminance carriers at a receiver having an increased vertical and horizontal resolution display capability; scanning the beam of display device in the receiver to a different pair of vertically-displaced lines during each of a plurality of horizontal line scans; and recovering the first and second luminance signals; alternately controlling the intensity of the beam with one of the first and second luminance signals during scanning of an associated one of each pair of vertically-displaced lines; recovering the transmitted successive video frame waveforms at the receiver; sampling the recovered waveforms to obtain first frame samples; delaying the first frame samples successively by each of two time delays, each of the same duration as the horizontal line; averaging the non-delayed and twice-delayed samples; alternately selecting one of the once-delayed and averaged samples; and providing increased-horizontal-resolution luminance information, responsive to the alternately-selected samples, for display of a television picture at the receiver.

19. The method of claim 15, further comprising the steps of: extracting information characterizing the sharpness of luminance edges from the received luminance information; and modifying the received chroma information responsive to the extracted luminance edge information to provide a displayed color television picture having an increased color resolution relative to the color resolution of a picture displayed with unmodified color information.

20. The method of claim 2, wherein the super-imposing step comprises the steps of: generating a bipolar, periodic, high-frequency sampling waveform; adding the sampling waveform to the vertical scanning waveform to provide the vertical deflection waveform; and moving the beam responsive to the vertical deflection waveform to periodically alternate the beam to positions above and below the position which would be occupied by beam reponsive solely to the vertical scanning waveform.

21. The method of claim 20, wherein step (d) comprises the steps of: sampling the camera video output signal at peaks in a first direction of the superimposed sampling waveform to generate video information for a first luminance signal; and sampling the camera video output signal at peaks in the opposite direction of the superimposed signal at peaks in the opposite direction of the superimposed sampling waveform to generate video information for a second luminance signal.

22. The method of claim 21, wherein the sampling waveform is generated at a frequency which is an integer multiple of the frequency at which the beam is horizontally line scanned.

23. The method of claim 22, wherein the sampling waveform frequency is on the order of three magnitudes greater than the horizontal line scanning frequency.

24. The method of claim 21, further comprising the steps of: adding the first and second luminance signals to provide a summed-luminance signal; and subtracting the second luminance signal from the first luminance signal to provide a difference-luminance signal.

25. The method of claim 24, wherein step (e) comprises the steps of: amplitude modulating a first luminance carrier to transmit the summed-luminance signal; and simultaneously amplitude modulating a second luminance carrier in phase-quadrature with the first luminance carrier to transmit the difference-luminance signal.

26. The method of claim 25, further comprising the steps of: receiving the modulated luminance carriers at a receiver having an increased-vertical-resolution display capability; synchronously quadrature detecting the received carriers to recover the summed-luminance and difference-luminance signals; generating the sampling signal at the receiver; generating the vertical scanning waveform of the receiver; adding the sampling signal to the vertical scanning waveform to provide a waveform for vertically deflecting a beam in a display device at the receiver; modulating the sampling signal with the recovered difference-luminance signal; and adding the modulated sampling signal and the summed-luminance signal to control the intensity of the display device beam to display an increased vertical resolution television picture.

27. The method of claim 26, further comprising the step of locking the sampling signals at the receiver and the transmitter to one another.

28. The method of claim 27, wherein a color television signal is being transmitted and received, and further comprising the step of using a chroma subcarrier signal as the sampling signal.

29. The method of claim 28, further comprising the steps of: extracting information characterizing the sharpness of luminance edges from the received luminance information; and modifying the received chroma information responsive to the extracted luminance edge information to provide a displayed color television picture having an increased color resolution relative to the color resolution of a picture displayed with unmodified color information.

30. The method of claim 25, further comprising the steps of: providing the camera with an increased luminance video bandwidth greater than the video bandwidth necessary for transmitting a signal with normal horizontal resolution; and transmitting at least the modulated first luminance carrier with at least one of the upper and lower sidebands thereof having greater bandwidth than the bandwidth normally utilized for transmission of a normal-resolution television signal and containing the additional horizontal resolution information in the increased camera video bandwidth.

31. The method of claim 30, wherein the lower sideband of the first carrier has a bandwidth greater than the upper sideband bandwidth.

32. The method of claim 31, wherein a color television signal is transmitted, further comprising the steps of: providing a chroma subcarrier in each of the upper and lower sidebands of the transmitted signal; and modulating each of the chroma subcarriers with different chroma information to provide a transmitted signal with increased chroma resolution capacity.

33. The method of claim 32, further comprising the steps of: receiving the modulated luminance carriers at a receiver having an increased vertical, horizontal and chroma resolution display capability; synchronously quadrature detecting the received carriers to recover the summed-luminance and difference-luminance signals; generating the sampling signal at the receiver; generating the vertical scanning waveform of the receiver; adding the sampling signal to the vertical scanning waveform to provide a waveform for vertically deflecting a beam in a display device at the receiver; modulating the sampling signal with the recovered difference-luminance signal; adding the modulated sampling signal and the summed-luminance signal to control the intensity of the display device beam to display an increased vertical resolution television picture; recovering the increased-horizontal-resolution information from the wide-bandwidth transmitted signal; and recovering the chroma information modulated onto each of the chroma subcarriers for providing increased chroma resolution in a displayed television picture having increased vertical, horizontal and chroma resolution.

34. The method of claim 30, further comprising the steps of: receiving the modulated luminance carriers at a receiver having an increased vertical and horizontal resolution display capability; synchronously quadrature detecting the received carriers to recover the summed-luminance and difference-luminance signals; generating the sampling signal at the receiver; generating the vertical scanning waveform of the receiver; adding the sampling signal to the vertical scanning waveform to provide a waveform for vertically deflecting a beam in a display device at the receiver; modulating the sampling signal with the recovered difference-luminance signal; adding the modulated sampling signal and the summed-luminance signal to control the intensity of the display device beam to display an increased vertical resolution television picture; and recovering the increased-horizontal-resolution information from the wide-bandwidth transmitted signal for displaying an increased-vertical and horizontal resolution-television picture.

35. The method of claim 34, further comprising the steps of: extracting information characterizing the sharpness of luminance edges from the received luminance information; and modifying the received chroma information responsive to the extracted luminance edge information to provide a displayed color television picture having an increased color resolution relative to the color resolution of a picture displayed with unmodified color information.

36. The method of claim 35, further comprising the steps of: scanning the camera beam through a normal number of horizontal scan lines for a normal-resolution picture; sampling each horizontal line at a sampling frequency causing an integer number I of substantially equally-spaced successive samples to occur for each pixel defined in a normal-resolution horizontal line;

selecting, for each successive one of a plurality number I of frames, similarly placed samples in each successive group of samples each having the integer number I of samples therein; forming each successive one of the integer number I of successive video frame waveforms from the successively selected sampled groups; and transmitting the successive video frame waveforms to provide a television picture having the integer number I of frames interlaced to provide a picture also having increased horizontal resolution when displayed.

37. The method of claim 36, wherein the integer multiple number I is equal to 2, and including the step of forming the video waveform, for each of a pair of alternating frames, of alternating ones of the totality of samples.

38. The method of claim 37, wherein the sampling frequency is an odd-integer multiple of one-half the frequency at which the horizontal lines are scanned.

39. The method of claim 38, further comprising the steps of: receiving the modulated luminance carriers at a receiver having an increased vertical and horizontal resolution display capability; scanning the beam of display device in the receiver to a different pair of vertically-displaced lines during each of a plurality of horizontal line scans; recovering the first and second luminance signals; alternately controlling the intensity of the beam with one of the first and second luminance signals during scanning of an associated one of each pair of vertically-displaced lines; recovering the transmitted successive video frame waveforms at the receiver; sampling the recovered waveforms to obtain first frame samples; storing the first frame samples; recovering the stored first frame samples during a second frame time interval; sampling the stored samples to recover second frame samples; and alternately using the first and second frame samples to provide increased-horizontal-resolution luminance information for display of an increased vertical and horizontal resolution television picture at the receiver.

40. The method of claim 38, further comprising the steps of: receiving the modulated luminance carriers at a receiver having an increased vertical and horizontal resolution display capability; scanning the beam of display device in the receiver to a different pair of vertically-displaced lines during each of a plurality of horizontal line scans; and recovering the first and second luminance signals; alternately controlling the intensity of the beam with one of the first and second luminance signals during scanning of an associated one of each pair of vertically-displaced lines; recovering the transmitted successive video frame waveforms at the receiver; sampling the recovered waveforms to obtain first frame samples; delaying the first frame samples successively by each of two time delays, each of the same duration as the horizontal line; averaging the non-delayed and twice-delayed samples; alternately selecting one of the once-delayed and averaged samples; and providing increased-horizontal-resolution luminance information, responsive to the alternately-selected samples, for display of a television picture at the receiver.

41. The method of claim 37, further comprising the steps of: extracting information characterizing the sharpness of luminance edges from the received luminance information; and modifying the received chroma information responsive to the extracted luminance edge information to provide a displayed color television picture having an increased color resolution relative to the color resolution of a picture displayed with unmodified color information.

42. The method of claim 2, wherein step (b) includes the step of doubling the number of horizontal line scans in the raster; and the superimposing step comprises the steps of: generating a bipolar square waveform having a frequency equal to one-half the doubled frequency at which the beam is horizontally line scanned; adding the square waveform to the vertical scanning waveform to provide a vertical deflection waveform; and moving the beam in the vertical direction responsive to the vertical deflection waveform to positions along a different one of a multiplicity of horizontal lines, equal in number to twice that in a normal resolution raster.

43. The method of claim 42, wherein step (d) comprises the steps of: dividing each of the multiplicity of horizontal scan lines in a raster into sequential groups of four individual lines; providing a first clock signal at a frequency twice that of a second clock signal; storing, at the first clock frequency and in a first storage means, the camera luminance video output signal responsive to a first line of each group being scanned by the beam; storing, at the first clock frequency and in a second storage means, the camera luminance video output signal responsive to a second line of each group being scanned by the beam; storing, at the first clock frequency and in a third storage means, the camera luminance video output signal responsive to a third line of each group; storing, at the first clock frequency and in a fourth storage means, the camera luminance video output signal, responsive to a fourth line of each group; simultaneously reading out at the second clock frequency the camera luminance video signals for the first and second lines respectively from the respective first and second storage means while the third and fourth lines of each group are being stored; then simultaneously reading out at the second clock frequency the camera luminance video signals for the third and fourth lines respectively from the respective third and fourth storage means while the first and second lines of a next-subsequent group are being stored; forming a first luminance signal from the first and third line signals sequential read-out of the first and third storage means; and forming a second luminance signal from the second and fourth line signals sequentially read out of the second and fourth storage means.

44. The method of claim 43, further comprising the steps of: adding the first and second luminance signals to provide a summed-luminance signal; and subtracting the second luminance signal from the first luminance signal to provide a difference-luminance signal.

45. The method of claim 44, wherein step (e) comprises the steps of: amplitude modulating a first luminance carrier to transmit the summed-luminance signal; and simultaneously amplitude modulating a second luminance carrier in phase-quadrature with the first luminance carrier to transmit the difference-luminance signal.

46. The method of claim 45, further comprising the steps of: receiving the modulated luminance carriers at a receiver having an increased-vertical-resolution display capability; synchronously quadrature detecting the received carriers to recover the summed-luminance and difference-luminance signals; doubling a received horizontal synchronization signal for providing a doubled-horizontal-frequency horizontal line scan waveform; generating the vertical scanning waveform at the receiver; providing a square waveform at the horizontal frequency; adding the square waveform to the vertical scanning waveform to provide a waveform for vertically deflecting a beam in a display device at the receiver, which beam is also horizontally deflected by the doubled-horizontal-frequency waveform; adding the summed-luminance and difference-luminance signals to provide a first luminance signal; subtracting the difference-luminance signal from the summed-luminance signal to provide a second luminance signal; storing the first and second luminance signals at a first clock rate; and alternately reading out the stored first and second luminance signals in first and second repetitions at a second clock rate, to control the intensity of the display device beam to display an increased vertical resolution television picture.

47. The method of claim 46, further comprising the step of locking the horizontal-frequency square waveforms at the receiver and transmitter to one another.

48. The method of claim 46, wherein a color television signal is being transmitted and received, and further comprising the steps of: recovering the color video information at the receiver; storing the color video information at the first clock rate in first and second registers; and alternately reading out the stored color video information from the first and second registers in two repetitions at the second clock rate and in synchronism with the luminance signals, to provide color information for the displayed picture.

49. The method of claim 46, further comprising the steps of: extracting information characterizing the sharpness of luminance edges from the received luminance information; and modifying the received color video information responsive to the extracted luminance edge information to provide a displayed color television picture having an increased color resolution relative to the color resolution of a picture displayed with unmodified color video information.

50. The method of claim 45, further comprising the steps of: providing the camera with an increased luminance video bandwidth greater than the video bandwidth necessary for transmitting a signal with normal horizontal resolution; and transmitting at least the modulated first luminance carrier with at least one of the upper and lower sidebands thereof having greater bandwidth than the bandwidth normally utilized for transmission of a normal-resolution television signal and containing the additional horizontal resolution information in the increased camerea video bandwidth.

51. The method of claim 50, wherein the lower sideband of the first carrier has a bandwidth greater than the upper sideband bandwidth.

52. The method of claim 51, wherein a color television signal is transmitted, further comprising the steps of: providing a chroma subcarrier in each of the upper and lower sidebands of the transmitted signal; and modulating each of the chroma subcarriers with different chroma information to provide a transmitted signal with increased chroma resolution capacity.

53. The method of claim 52, further comprising the steps of: receiving the modulated luminance carriers at a receiver having an increased vertical, horizontal and chroma resolution display capability; synchronously quadrature detecting the received carriers to recover the summed-luminance and difference-luminance signals; doubling a received horizontal synchronization signal for providing a doubled-horizontal-frequency horizontal line scan waveform; generating the vertical scanning waveform at the receiver; providing a square waveform at the horizontal frequency; adding the square waveform to the vertical scanning waveform to provide a waveform for vertically deflecting a beam in a display device at the receiver, which beam is also horizontally deflected by the doubled-horizontal-frequency waveform; adding the summed-luminance and difference-luminance signals to provide a first luminance signal; subtracting the difference-luminance signal from the summed-luminance signal to provide a second luminance signal; storing the first and second luminance signals at a first clock rate; alternately reading out the stored first and second luminance signals in first and second repetitions at a second clock rate, to control the intensity of the display device beam; and recovering the chroma information modulated onto each of the chroma subcarriers for providing increased chroma resolution, to display a television picture having increased vertical, horizontal and chroma resolution.

54. The method of claim 50, further comprising the steps of: receiving the modulated luminance carriers at a receiver having an increased-vertical-resolution display capability; synchronously quadrature detecting the received carriers to recover the summed-luminance and difference-luminance signals; doubling a received horizontal synchronization signal for providing a doubled-horizontal-frequency horizontal line scan waveform; generating the vertical scanning waveform at the receiver; providing a square waveform at the horizontal frequency; adding the square waveform to the vertical scanning waveform to provide a waveform for vertically deflecting a beam in a display device at the receiver, which beam is also horizontally deflected by the doubled-horizontal-frequency waveform; adding the summed-luminance and difference-luminance signals to provide a first luminance signal; subtracting the difference-luminance signal from the summed-luminance signal to provide a second luminance signal; storing the first and second luminance signals at a first clock rate; alternately reading out the stored first and second luminance signals in first and second repetitions at a second clock rate, to control the intensity of the display device beam; and recovering the increased-horizontal-resolution information from the wide-bandwidth transmitted signal for display an increased-vertical and horizontal resolution television picture.

55. The method of claim 50, further comprising the steps of: extracting information characterizing the sharpness of luminance edges from the received luminance information; and modifying the received chroma information responsive to the extracted luminance edge information to provide a displayed color television picture having an increased color resolution relative to the color resolution of a picture displayed with unmodified color information.

56. The method of claim 45, further comprising the steps of: scanning the camera beam through a normal number of horizontal scan lines for a normal-resolution picture; sampling each horizontal line at a sampling frequency causing an integer number $I$ of substantially equally-spaced successive samples to occur for each pixel defined in a normal-resolution horizontal line; selecting, for each successive one of a plurality number $I$ of frames, similarly placed samples in each successive group of samples each having the integer number $I$ of samples therein; forming each successive one of the integer number $I$ of successive video frame waveforms from the successively selected sampled groups; and transmitting the successive video frame waveforms to provide a television picture having the integer number I of frames interlaced to provide a picture also having increased horizontal resolution when displayed.

57. The method of claim 56, wherein the integer multiple number I is equal to 2, and including the step of forming the video waveform, for each of a pair of alternating frames, of alternating ones of the totality of samples.

58. The method of claim 57, wherein the sampling frequency is an odd-integer multiple of one-half the frequency at which the horizontal lines are scanned.

59. The method of claim 58, further comprising the steps of: receiving the modulated luminance carriers at a receiver having an increased vertical and horizontal resolution display capability; scanning the beam of a display device in the receiver to a different pair of vertically-displaced lines during each of a plurality of horizontal line scans; recovering the first and second luminance signals; alternately controlling the intensity of the beam with one of the first and second luminance signals during scanning of an associated one of each pair of vertically-displaced lines; recovering the transmitted successive video frame waveforms at the receiver; sampling the recovered waveforms to obtain first frame samples; storing the first frame samples; recovering the stored first frame samples during a second frame time interval; sampling the stored samples to recover second frame samples; and alternately using the first and second frame samples to provide increased-horizontal-resolution luminance information for display of an increased vertical and horizontal resolution television picture at the receiver.

60. The method of claim 58, further comprising the steps of: receiving the modulated luminance carriers at a receiver having an increased vertical and horizontal resolution display capability; scanning the beam of display device in the receiver to a different pair of vertically-displaced lines during each of a plurality of horizontal line scans; recovering the first and second luminance signals; alternately controlling the intensity of the beam with one of the first and second luminance signals during scanning of an associated one of each pair of vertically-displaced lines; recovering the transmitted successive video frame waveforms at the receiver; sampling the recovered waveforms to obtain first frame samples; delaying the first frame samples successively by each of two time delays, each of the same duration as the horizontal line scan; averaging the non-delayed and twice-delayed samples; alternately selecting one of the once-delayed and averaged samples; and providing increased-horizontal-resolution luminance information responsive to the alternately-selected samples, for display of an increased vertical and horizontal resolution television picture at the receiver.

61. The method of claim 57, further comprising the steps of: extracting information characterizing the sharpness of luminance edges from the received luminance information; and modifying the received chroma information responsive to the extracted luminance edge information to provide a displayed color television picture also having an increased color resolution relative to the color resolution of a picture displayed with unmodified color information.

62. A method for increasing the horizontal luminance resolution of a television signal, comprising the steps of:

generating a raster scan waveform having a standard number of horizontal and vertical scan lines in a display raster;

providing a camera having a luminance video output of magnitude responsive to the visual luminance value at a spot on said raster then being scanned by a beam responsive to said raster scan waveform;

providing the camera with a luminance video bandwidth greater than the normal video bandwidth utilized with a raster having the standard number of scan lines; and transmitting the luminance video output of said camera as a modulated carrier signal having a lower sideband of bandwidth greater than an upper sideband and with a total bandwidth substantially greater than the bandwidth normally utilized for transmitting a television signal having the normal scan line video signal.

63. The method of claim 62, furhter including the steps of: receiving the greater-bandwidth carrier signal at a receiver having an increased horizontal resolution capacity; and recovering the increased-horizontal-resolution information for displaying an increased horizontal resolution television picture.

64. The method of claim 63, wherein a color television signal is transmitted, and further comprising the steps of: recovering chroma information from the received color signal, characterizing the sharpness of luminance edges from the received luminance video information; and modifying the received chroma information responsive to the extracted luminance edge information to provide a displayed color television picture having an increased color resolution relative to the color resolution of a picture displayed with unmodified color information.

65. The method of claim 62, further comprising the steps of: providing a chroma subcarrier in each of the upper and lower sidebands of the transmitted signal; and modulating each of the chroma subcarriers with different chroma information to provide a transmitted signal with increased chroma resolution.

66. The method of claim 65, further including the steps of: receiving the greater-bandwidth carrier signal at a receiver having an increased horizontal and chroma resolution capacity; and recovering the chroma information modulated onto each of the chroma subcarriers for providing increased chroma resolution.

67. A method for increasing the horizontal luminance resolution of a television signal, comprising the steps of: providing a television camera having a high horizontal video resolution capability; scanning a camera beam through a normal number of horizontal scan lines for a normal-resolution picture; sampling the luminance values along each horizontal scan line at a sampling frequency causing an integer number I of substantially equally-spaced successive samples to occur for each pixel defined in a normal-resolution horizontal line; selecting, for each successive one of a plurality I of frames, similarly placed samples in each successive group of samples each having the integer number I of samples therein; forming each successive one of the integer number I of successive video frame waveforms from the successively selected sampled groups; and transmitting the successive video frame waveforms to provide a television picture having the integer number I of frames interlaced to provide a picture also having increased horizontal resolution when displayed.

68. The method of claim 67, wherein the integer multiple number I is equal to 2, and including the step of forming the video waveform, for each of a pair of alternating frames, of alternating ones of the totality of samples.

69. The method of claim 68, wherein the sampling frequency is an odd-integer multiple of one-half the frequency at which the horizontal lines are scanned.

70. The method of claim 69, further comprising the steps of: recovering the transmitted successive video frame waveform at a receiver having an increased horizontal resolution display capability; sampling the recovered waveforms to obtain first frame samples; storing the first frame samples; recovering, during a second frame time interval, the stored first frame samples; sampling the stored samples during the second frame time interval to recover second frame samples; and alternately using the first and second frame samples to provide increased-horizontal-resolution luminance information for display of an increased resolution television picture at the receiver.

71. The method of claim 70, wherein a color television signal is transmitted with chroma information, and further comprising the steps of: extracting information characterizing the sharpness of luminance edges from the recovered luminance information at the receiver; recovering the transmitted chroma information at the receiver; and modifying the recovered chroma information responsive to the extracted luminance edge information to provide a displayed color television picture having an increased color resolution relative to the color resolution of a picture displayed with unmodified color information.

72. The method of claim 69, further comprising the steps of: recovering the transmitted successive video frame waveforms at a receiver having an increased horizontal resolution display capability; sampling the recovered waveforms to obtain first frame samples; delaying the first frame samples successively by each of two time delays, each of the same duration as the horizontal scan line; averaging the non-delayed and twice-delayed samples; alternately selecting one of the once-delayed and averaged samples; and providing increased-horizontal-resolution luminance information, responsive to the alternately-selected samples, for display of a television picture at the receiver.

73. The method of claim 72, wherein a color television signal is transmitted with chroma information, and further comprising the steps of: extracting information characterizing the sharpness of luminance edges from the recovered luminance information at the receiver; recovering the transmitted chroma information at the receiver; and modifying the recovered chroma information responsive to the extracted luminance edge information to provide a displayed color television picture having an increased color resolution relative to the color resolution of a picture displayed with unmodified color information.

74. A method for increasing chroma resolution in a received color television signal, comprising the steps of:
recovering luminance information from the received television signal;
recovering chroma information from the received television signal;
extracting information characterizing the sharpness of luminance edges from the recovered luminance information; and
modifying the recovered chroma information, responsive to the extracted luminance edge information, to increase the sharpness of chroma edges and provide a displayed color television signal having an increased color resolution relative to the color resolution of a picture displayed with unmodified color information.

75. The method of claim 74, wherein the luminance edge information extracting step comprises the steps of: detecting the amplitude of each luminance edge; and generating an edge correction waveform having an abrupt polarity-reversal portion occurring substantially at the mid-point of each luminance edge and having amplitude and polarity responsive to the amplitude and polarity of the luminance edge.

76. The method of claim 75, wherein the received chroma information is provided as at least one chroma waveform; and the information modifying step includes the steps of: detecting the amplitude of each of the at least one chroma waveform; adjusting, for each chroma waveform, the polarity of the detected luminance edge amplitude waveform to correspond to the polarity of the associated one of the at least one chroma waveform; adjusting, for each chroma waveform, the polarity of the error correction waveform responsive to the associated polarity adjustment of the luminance edge amplitude waveform; adjusting, for each chroma waveform, the amplitude of the associated polarity-adjusted edge correction waveform responsive to a comparison between the associated corrected-polarity luminance edge amplitude waveform and the amplitude of the associated chroma waveform; and adding each of the at least one gain-and-polarity-corrected edge correction waveform to the associated one of the at least one chroma waveform to provide a like number of at least one edge-sharpened chroma waveform for displaying a color television picture at the receiver.

77. Apparatus for transmitting a television signal with increased vertical resolution, comprising:
first means for providing a horizontal line scanning waveform;
second means for providing a vertical line scanning waveform;
at least one camera tube having at least one beam scanned to a raster position responsive to the vertical and horizontal line scanning waveforms for providing at least one video signal of amplitude responsive to the amount of light impinging upon the spot at which the associated camera beam is then positioned;
third means for providing another waveform combinable with said vertical line scanning waveform for causing each of the said at least one camera beam to scan at least consecutive portions of a plurality of vertically-displaced and non-overlapping lines during each horizontal scan; and
a plurality of means each for sampling and holding the amplitude of the video waveform output from each of the at least one camera tube whenever said at least one beam is at a point defining an associated one of said plurality of vertically-displaced lines, each of said sampling and holding means providing one of a like plurality of sequential vertical line video waveforms for transmission.

78. The apparatus of claim 77, wherein: said third means provides said another waveform of substantially sinusoidal shape; a pair of vertically-displaced lines are scanned during each horizontal scan; and said sampling and holding means associated with each camera tube includes a pair of sample-and-hold circuits receiving the associated camera video waveform, with a first one of said circuits being strobed to operate at each successive one of the positive-polarity peaks of said another waveform and the second one of said circuits being strobed to operate at each successive one of the negative-polarity peaks of said another waveform, to provide first and second luminance signals.

79. The apparatus of claim 78, further comprising: means for adding the first and second luminance signals to provide a summed-luminance signal; means for subtracting the second luminance signal from the first luminance signal to provide a difference-luminance signal; means for providing first and second transmission carriers at the same frequency and in quadrature phase with one another; means for modulating the first carrier signal with the summed-luminance signal; means for modulating the second carrier signal with the difference-luminance signal; and means for adding the first and second modulated carrier signals to provide a high-resolution-vertical television signal for transmission.

80. The apparatus of claim 79, wherein color television signals are to be transmitted, said apparatus including a plurality of color camera tubes and sampling means providing a like plurality of sampled-and-held signals; and further including means for matrixing the plurality of sampled-and-held first and second luminance signals to provide the first and second luminance signals to said adding and subtracting means.

81. The apparatus of claim 78, further comprising: a receiver having an increased-vertical-resolution display device; means for providing said another waveform at the receiver; means for synchronously quadrature detecting the television signal transmitted to the receiver to recover at least the summed-luminance and difference-luminance signals; means for modulating the another waveform with the difference-luminance signal; and means for adding the output of the modulating means to the summed-luminance signal to provide luminance information for display of an increased-vertical-resolution picture on the receiver display device.

82. Apparatus for transmitting a television signal with increased vertical resolution, comprising:
first means for providing a horizontal line scanning waveform at a frequency equal to an even-integer multiple of a normal horizontal scanning frequency;
second means for providing a vertical line scanning waveform;
third means for providing a square waveform at a frequency equal to one-half the horizontal line scanning frequency provided in said first means;
means for combining said vertical line scanning waveform and said another waveform to provide a vertical deflection waveform;
at least one camera tube having at least one beam scanned to a raster position responsive to the vertical deflection and horizontal line scanning waveforms for providing at least one video signal of amplitude responsive to the amount of light impinging upon the spot at which the associated camera beam is then positioned; and
means for consecutively storing the video signals produced during scanning of a plurality of horizontal line scans and for simultaneously reading out another plurality of nonconsecutive stored video signals to provide a like plurality of video luminance waveforms for transmission.

83. The apparatus of claim 82, wherein the integral multiple is 2, and said storing and reading out means includes: four line storage means each having a storage input and an output; first switching means for sequentially connecting the video signal from an associated camera tube to the storage input of sequential ones of the line storing means; clock means for causing each storage means to store video information at a first rate whenever the line storage means input is connected through said first switching means to receive the camera video signal and for reading out the signal from the output of that storing means at one-half the storing rate; and second switching means receiving the output of each line storing means for providing a first video luminance waveform alternately from the output of the first and third line storage means, and for providing a second video luminance waveform alternately from the output of the second and fourth line storage means.

84. The apparatus of claim 83, further comprising: means for adding the first and second luminance signals to provide a summed-luminance signal; means for subtracting the second luminance signal from the first luminance signal to provide a difference-luminance signal; means for providing first and second transmission carriers at the same frequency and in quadrature phase with one another; means for modulating the first carrier signal with the summed-luminance signal; means for modulating the second carrier signal with the difference-luminance signal; and means for adding the first and second modulated carrier signals to provide a high resolution-vertical television signal for transmission.

85. The apparatus of claim 84, wherein color television signals are to be transmitted, said apparatus including a plurality of color camera tubes and a like plurality of storing means each providing the same plurality of first and second luminance signals; and further comprising means for matrixing the plurality of first and second luminance signals to provide the first luminance signals to said adding and subtracting means.

86. The apparatus of claim 83, further comprising: a receiver having an increased-vertical-resolution display device; means for synchronously quadrature detecting the television signal transmitted to the receiver to recover at least the summed-luminance and difference-luminance signals; means for adding and subtracting the summed-luminance and difference-luminance signals to recover the first and second luminance signals; means for storing each of the first and second luminance signals at a first rate and for reading out each of the stored signals at a rate twice as great as the first rate; means for providing a double-horizontal-frequency horizontal line scanning waveform to said display device; and means for detecting the proper phase of the doubled-horizontal-frequency waveform for synchronizing connection of the proper one of the read-out first and second luminance waveforms to the display device for displaying the proper luminance information for an increased-vertical-resolution picture.

87. Apparatus for transmitting a television signal with increased horizontal luminance resolution, including:
means for generating a raster scan waveform having a standard number of vertical and horizontal scan lines in the display raster;
a television camera having a luminance video output of magnitude responsive to the video luminance value at a spot on said raster then being scanned by a camera beam responsive to said raster scan waveform, said camera having a luminance video bandwidth greater than the normal bandwidth utilized with a raster having the standard number of scan lines; and means for transmitting the luminance video output of the camera as a modulated carrier signal having a lower sideband of bandwidth greater than an upper sideband bandwidth and a total bandwidth substantially greater than the bandwidth normally utilized for transmitting a television signal having a normal scan line video signal.

88. The apparatus of claim 87, further comprising a receiver having: a display device of increased horizontal resolution capability; and means for recovering video luminance information of greater bandwidth than the video bandwidth normally utilized with a normal horizontal resolution picture, for providing luminance information to the receiver display device to display an increased horizontal resolution television picture.

89. The apparatus of claim 88, wherein the transmitter further comprises: means for transmitting first and second chroma subcarriers, each chroma subcarrier being in a different one of the upper and lower sidebands of the transmitted signal; means for modulating different chroma information upon each of the first and second chroma subcarriers; and the receiver further comprises: means for recovering chroma information from each of the first and second subcarriers received at said receiver for displaying an increased horizontal resolution color television picture on the display device thereof.

90. Apparatus for increasing the horizontal luminance resolution of a television picture, comprising:

a television camera having a high horizontal resolution capability;

means for scanning a beam of the camera through a normal number of horizontal scan lines for a normal resolution picture;

means for sampling the luminescence values along each horizontal scan line of a sampling frequency causing an integer number I of substantially equally-spaced successive samples to recover each pixel defined in a normal-resolution-horizontal line;

means for selecting, for each successive one of a plurality I frames, similarly placed samples in each successive group of samples each having the integer number I of samples therein;

means for forming each successive one of the integer number I of successive video frame waveforms from the successively selected sample group; and means for sequentially transmitting the successive video frame waveforms, to provide a television signal representing a picture having the integer number I of frames interlaced to provide a picture increased horizontal resolution when displayed at a receiver.

91. The apparatus of claim 90, wherein the integer multiple I is equal to 2; and the video waveform forming means is a means for forming each of a pair of alternating frame video waveforms from alternating ones of the totality of samples.

92. The apparatus of claim 91, wherein the sampling frequency is an odd-integer multiple of one-half the frequency at which the horizontal lines are scanned.

93. The apparatus of claim 92, further comprising a receiver including: a device for displaying a television signal with increased horizontal resolution; means for recovering the transmitted successive video frame waveforms; means for sampling the recovered waveforms to obtained first frame samples; means for storing the first frame samples; means for recovering, during a second frame time interval, the stored first frame samples; means for sampling the stored samples during the second frame time interval to recover second frame samples; and means for alternatingly providing the first and second frame samples to the display device for display of an increased horizontal resolution television picture thereon.

94. The apparatus of claim 92, further comprising a receiver including: a device for displaying a television signal with increased horizontal resolution; means for recovering the transmitted successive video frame waveforms; means for sampling the recovered waveforms to obtain first frame samples; first and second means for successively delaying the first frame samples each by a time delay having the same duration as the horizontal scan line; means for averaging the non-delayed sample and the sample after passage through the first and second delaying means; and means for alternately selecting the output from the sampling means and the first delaying means for providing luminance information to the display device for display of an increased horizontal resolution television picture thereon.

95. Apparatus for increasing chroma resolution in a color television receiver, comprising:

means for recovering luminance information from a received television signal;

means for recovering chroma information from a received color television signal;

means for extracting information characterizing the sharpness of luminance edges from the recovered luminance information; and means for modifying the recovered chroma information, responsive to the extracted luminance edge information, to enhance the sharpness of chroma edges and increase color resolution in a color picture displayed, responsive to the modified chroma information and the recovered luminance information, relative to the color resolution of a picture displayed on the same device with unmodified color information.

96. The apparatus of claim 95, wherein the luminance edge information extracting means comprises: means for detecting the amplitude of each luminance edge; and means for generating an edge correction waveform having an abrupt polarity-reversal portion occurring substantially at the midpoint of each luminance edge and having amplitude and polarity responsive to the amplitude and polarity of the luminance edge.

97. The apparatus of claim 96, wherein at least one of the amplitude detecting means and the correction waveform generating means include a weighted-summation network.

98. The apparatus of claim 96, wherein the received chroma information is provided as at least one chroma waveform and wherein, for each chroma waveform provided in the receiver, the chroma modifying means includes: means for detecting the amplitude of the associated chroma waveform; first means for adjusting the polarity of the detected luminance edge amplitude waveform to correspond to the polarity of the associated chroma waveform; second means for adjusting the polarity of the error correction waveform responsive to adjustment of the luminance edge amplitude waveform in the associated first adjusting means; means for comparing the associated corrected-polarity luminance edge amplitude waveform and the amplitude of the associated chroma waveform in the second adjusting means to provide a gain adjustment signal; means for comparing the associated corrected-polarity luminance edge amplitude waveform and the amplitude of the associated chroma waveform in the second adjusting means to provide a gain adjustment signal; third means for adjusting the amplitude of the associated polarity-adjusted edge correction waveform from the second adjusting means, responsive to the gain adjusting signal; and means for adding each of the gain-and-polarity corrected edge correction waveform to the associated chroma waveform to provide an edge-sharpened chroma waveform for use in displaying a color television picture with increased chroma resolution on the receiver display device.

* * * * *